(12) United States Patent
Matsuzaki

(10) Patent No.: US 12,211,140 B2
(45) Date of Patent: Jan. 28, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Eiichi Matsuzaki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 5 days.

(21) Appl. No.: 18/055,259

(22) Filed: Nov. 14, 2022

(65) Prior Publication Data

US 2023/0162435 A1    May 25, 2023

(30) Foreign Application Priority Data

Nov. 19, 2021    (JP) .................................. 2021-189029

(51) Int. Cl.
*G06T 15/20*    (2011.01)
*G06T 15/10*    (2011.01)

(52) U.S. Cl.
CPC ............ *G06T 15/205* (2013.01); *G06T 15/10* (2013.01); *G06T 15/20* (2013.01)

(58) Field of Classification Search
CPC ....... G06T 15/205; G06T 15/00; G06T 15/10; G06T 15/40; G06T 17/00; G06T 17/05; G06T 17/10; G06T 15/20; G06F 3/011; G06F 3/012; G06F 3/013; G06F 3/017
See application file for complete search history.

(56) References Cited

U.S. PATENT DOCUMENTS

| | | | |
|---|---|---|---|
| 10,659,769 B2* | 5/2020 | Mizuno | H04N 13/279 |
| 10,880,533 B2* | 12/2020 | Kawahara | H04N 13/117 |
| 10,917,621 B2* | 2/2021 | Iwakiri | H04N 13/117 |
| 11,250,619 B2* | 2/2022 | Sakakima | G06T 17/00 |
| 11,798,224 B2* | 10/2023 | Umemura | H04N 13/282 |
| 2018/0359458 A1* | 12/2018 | Iwakiri | G06T 15/205 |

FOREIGN PATENT DOCUMENTS

JP    2017211828 A    11/2017

* cited by examiner

*Primary Examiner* — Vijay Shankar
(74) *Attorney, Agent, or Firm* — Canon U.S.A., Inc. IP Division

(57) ABSTRACT

A back-end server acquires viewpoint information representing a position of a virtual viewpoint and a line-of-sight direction from the virtual viewpoint used to generate a virtual viewpoint image based on a plurality of images captured by a plurality of image capturing apparatuses, outputs a first virtual viewpoint image generated using three-dimensional geometric data representing the three-dimensional shape of an object for which the virtual viewpoint image is to be generated if the object is included in an area that is captured by the plurality of image capturing apparatuses, and outputs a second virtual viewpoint image generated without using the three-dimensional geometric data if the object is included in an area that is not captured by a subset of the plurality of image capturing apparatuses.

12 Claims, 14 Drawing Sheets

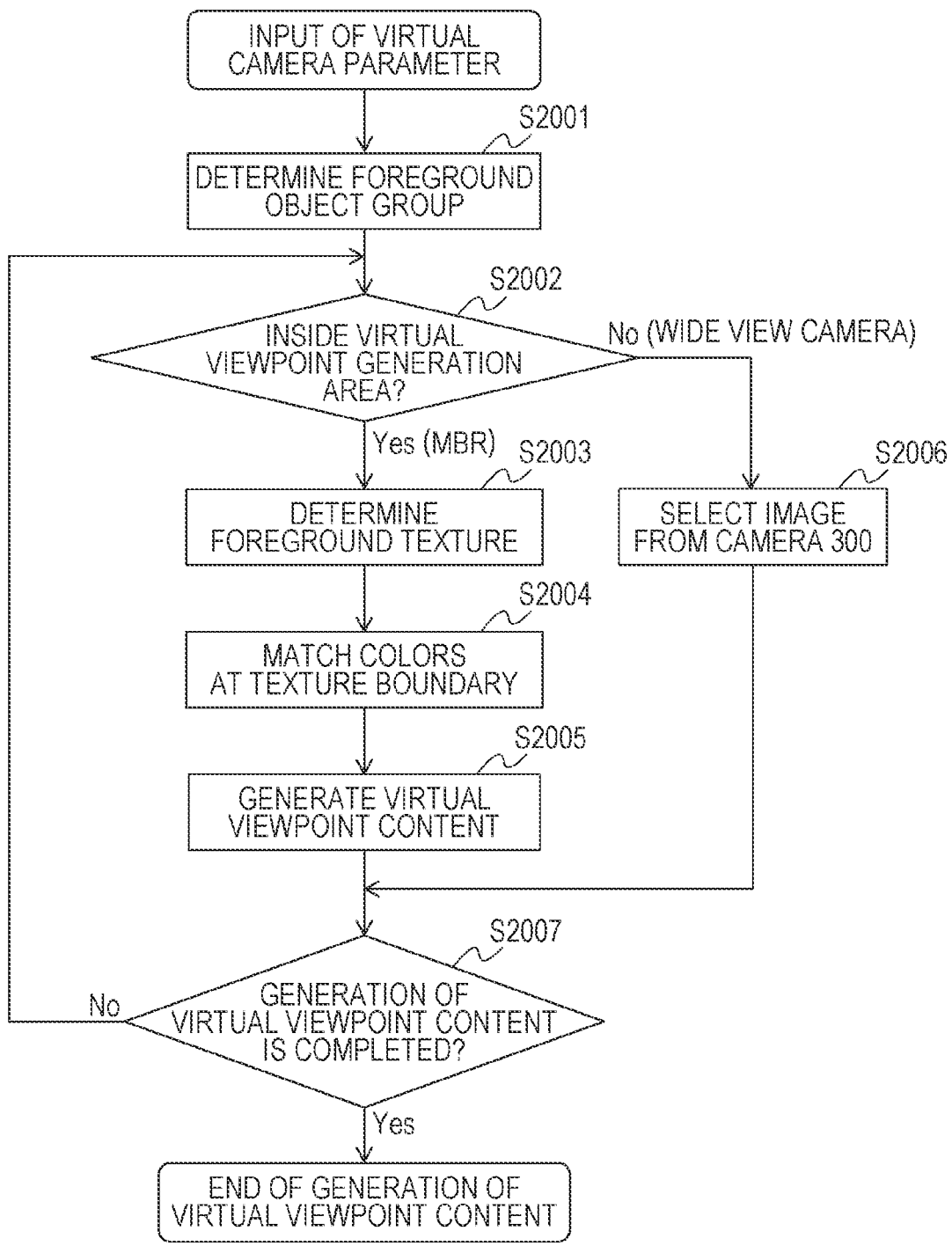

INFORMATION PROCESSING APPARATUS, INFORMATION PROCESSING METHOD, AND STORAGE MEDIUM

BACKGROUND

Field

The present disclosure relates to a technology for generating a virtual viewpoint image.

Description of the Related Art

In recent years, attention has been focused on a technology in which a plurality of image capturing devices (cameras) are installed at different positions to perform multi-viewpoint synchronous image capturing, and virtual viewpoint content is generated using captured multi-viewpoint images. In virtual viewpoint content generation technology, a user can obtain an image viewed from a specified viewpoint (a virtual viewpoint). According to the technology for generating virtual viewpoint content from a plurality of viewpoint images in the above-described manner, highlight scenes of, for example, a soccer or basketball game can be viewed from various angles, which gives a user a high realistic sensation as compared with a normal image. For example, a plurality of cameras are installed so that their optical axes are directed in predetermined directions, and virtual viewpoint content is generated so as to correspond to an image capture area at the center of which there is the intersection point (hereinafter also referred to as a "gaze point"). At this time, cameras can be set so that a plurality of centers of the optical axes are present and, thus, more virtual viewpoint content can be generated for more areas.

Japanese Patent Laid-Open No. 2017-211828 describes generation of a virtual viewpoint image by using captured images acquired from a camera group directed toward a specific position (hereinafter referred to as a gaze point).

However, according to the technique described in Japanese Patent Laid-Open No. 2017-211828, the quality of the virtual viewpoint image may be degraded if an object for which a virtual viewpoint image is to be generated is not included in the image capture area. This is because, for example, the number of cameras that capture the image of the object is less than the number of cameras included in the camera group. Japanese Patent Laid-Open No. 2017-211828 does not take into account the issue.

SUMMARY

The present disclosure provides a technology in which a virtual viewpoint image without quality loss is output regardless of the position of the object for which the virtual viewpoint image is to be generated.

According to an aspect of the present disclosure, an information processing apparatus acquires viewpoint information representing a position of a virtual viewpoint and a line-of-sight direction from the virtual viewpoint used to generate a virtual viewpoint image based on a plurality of images captured by a plurality of image capturing apparatuses and outputs an image based on the acquired viewpoint information. The information processing apparatus outputs a first virtual viewpoint image generated using three-dimensional geometric data representing the three-dimensional shape of an object for which the virtual viewpoint image is to be generated if the object is included in an area that is captured by the plurality of image capturing apparatuses and outputs a second virtual viewpoint image generated without using the three-dimensional geometric data if the object is included in an area that is not captured by a subset of the plurality of image capturing apparatuses.

Further features of the present disclosure will become apparent from the following description of exemplary embodiments with reference to the attached drawings.

BRIEF DESCRIPTION OF THE DRAWINGS

FIG. 14 is a flowchart illustrating the flow of processing performed by the back-end server according to one or more aspects of the present disclosure.

DESCRIPTION OF THE EMBODIMENTS

First Embodiment

Figure 1:
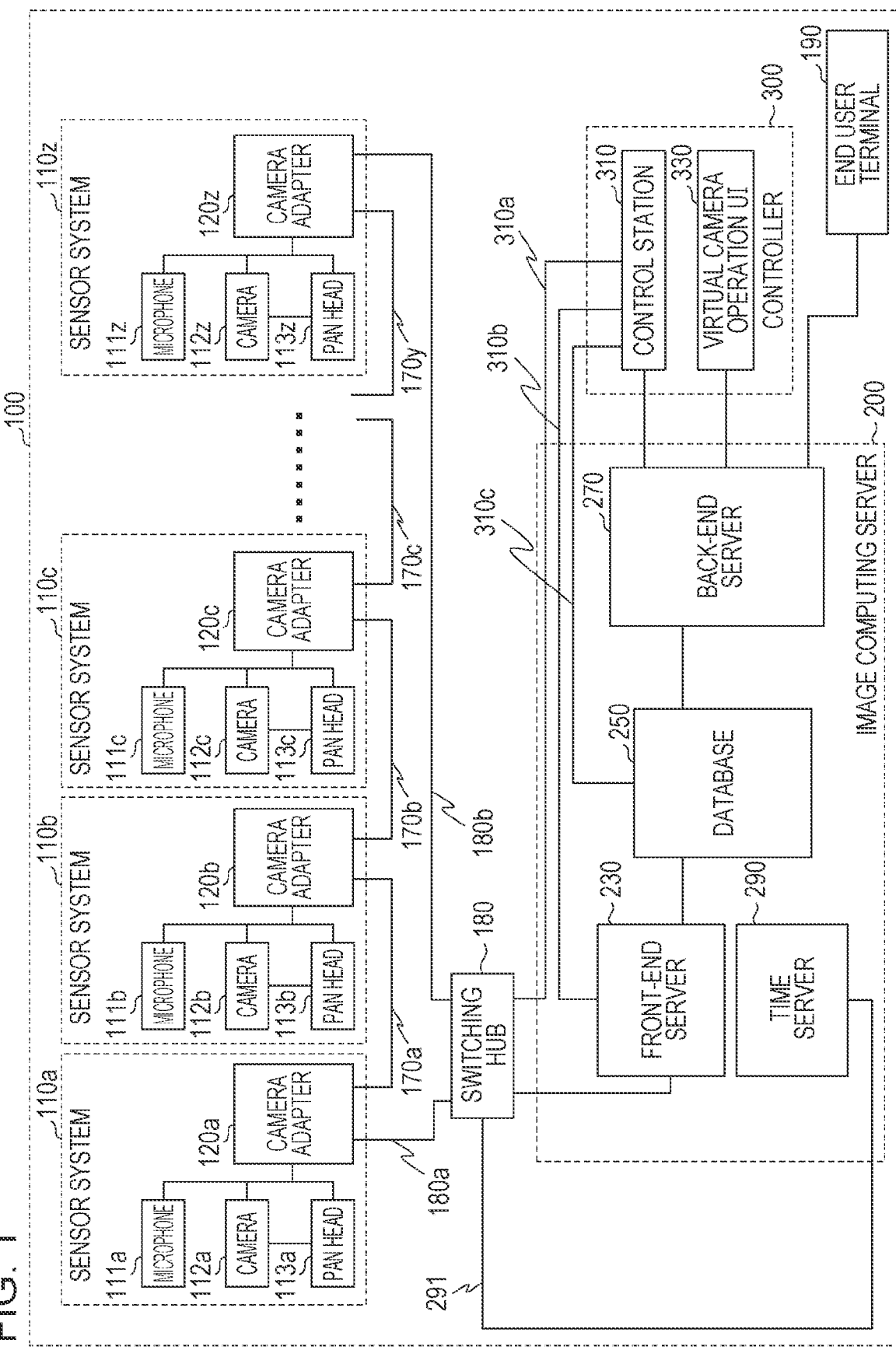
FIG. 1 is a schematic configuration diagram of an image processing system.

A system that installs a plurality of cameras and microphones in a facility, such as a stadium or a concert hall, and captures images and audio is described below with reference to a system configuration diagram illustrated in FIG. 1. An image processing system 100 includes sensor systems 110a to 110z, an image computing server 200, a controller 300, a switching hub 180, and an end user terminal 190.

The controller 300 includes a control station 310 and a virtual camera operation UI 330.

The control station 310 manages the operation status and controls parameter setting for each of blocks constituting the image processing system 100 via networks 310a to 310c, 180a, 180b, and 170a to 170y. Note that the networks may be GbE (Gigabit Ethernet) or 10 GbE conforming to the IEEE standard, which is Ethernet (registered trademark) or may be configured by combining interconnect Infiniband, industrial Ethernet, and the like. However, the networks are not limited thereto and may be a network of another type.

The operation to transmit the 26 sets of images and audio of the sensor systems 110a to 110z from the sensor system 110z to the image computing server 200 is described first. In the image processing system 100 of the present embodiment, the sensor systems 110a to 110z are connected in a daisy chain fashion.

According to the present embodiment, the 26 systems from the sensor system 110a to the sensor system 110z are individually referred to as a "sensor system 110", and collectively as the sensor systems 110, unless otherwise specified. Similarly, devices in each of the sensor systems 110 are referred to as a microphone 111, a camera 112, a pan head 113, an external sensor 114, and a camera adapter 120, unless otherwise specified. Note that 26 sensor systems in this description are only illustrative, and the number of sensor systems is not limited thereto. Unless otherwise specified, the term "image" as used herein refers to both still and moving images. That is, the image processing system 100 of the present embodiment can process both still images and moving images. In addition, according to the present embodiment, description is made with reference to an example in which the virtual viewpoint content provided by the image processing system 100 includes a virtual viewpoint image and virtual viewpoint audio. However, the present disclosure is not limited thereto. For example, virtual viewpoint content does not necessarily have to include audio. Furthermore, for example, the audio included in the virtual viewpoint content may be audio collected by the microphone closest to the virtual viewpoint. According to the present embodiment, although some descriptions of audio are not provided for simplicity, both an image and audio are basically processed at the same time.

The sensor systems 110a to 110z each include one image capturing apparatus (one of the cameras 112a to 112z). That is, the image processing system 100 includes a plurality of cameras for capturing the image of an object from a plurality of directions. The plurality of sensor systems 110 are connected in a daisy chain fashion. This connection configuration can reduce the number of connection cables and reduces wiring work when the resolution of captured images is increased to 4K or 8K and the capacity of image data is increased due to an increase in frame rate.

Note that the connection configuration is not limited thereto. The connection configuration may be a star network configuration in which each of the sensor systems 110a to 110z is connected to the switching hub 180 and, thus, data is transmitted and received between the sensor systems 110 via the switching hub 180.

In addition, although FIG. 1 illustrates the configuration in which all the sensor systems 110a to 110z are cascaded to form a daisy chain, the configuration is not limited thereto. For example, the plurality of sensor systems 110 may be divided into several groups, and the sensor systems 110 may be daisy-chained on a group-by-group basis. In this case, the camera adapter 120, which is the terminal group of the groups, may be connected to a switching hub and input the images to the image computing server 200. Such a configuration is particularly effective in stadiums. For example, a stadium may have multiple floors, and the sensor system 110 may be disposed on each floor. In this case, an image can be input to the image computing server 200 on a floor-by-floor basis or for each half circumference of the stadium. In this way, even in a place where all the sensor systems 110 are difficult to connect using a single daisy chain, the sensor systems 110 can be easily disposed, and the system flexibility can be increased.

Furthermore, control of image processing performed by the image computing server 200 is changed depending on whether only one camera adapter 120 or two or more camera adapter 120, which are daisy-chained, input the images to the image computing server 200. That is, the control is changed depending on whether the sensor systems 110 are divided into a plurality of groups. When only one camera adapter 120 inputs the images, the image of the entire circumference of the stadium is generated while the images are being transmitted through daisy chain connection. For this reason, the timings of acquisition of all image data for the entire circumference of the stadium are synchronized in the image computing server 200. That is, if the sensor systems 110 are not divided into groups, then synchronization is achieved.

However, when a plurality of camera adapters 120 input images (the sensor systems 110 are divided into groups), the delay may differ from daisy chain lane (path) to daisy chain lane (path). Therefore, it should be noted that the image computing server 200 needs to perform a synchronization process such that acquisition of all image data is checked and, after all the image data for the entire circumference are gathered, the subsequent image processing is performed.

According to the present embodiment, the sensor system 110a includes a microphone 111a, a camera 112a, a pan head 113a, an external sensor 114a, and a camera adapter 120a. Note that the configuration is not limited thereto. The sensor system 110a is only required to include at least one camera adapter 120a and one of one camera 112a and one microphone 111a. Alternatively, for example, the sensor system 110a may be configured by one camera adapter 120a and a plurality of cameras 112a or may be configured by one camera 112a and a plurality of camera adapters 120a. That is, in the image processing system 100, N cameras 112 correspond to M camera adapters 120 (N and M are integers greater than or equal to 1). In addition, the sensor system 110 may include a device other than the microphone 111a, the camera 112a, the pan head 113a, and the camera adapter 120a. Alternatively, the camera 112 and the camera adapter 120 may be integrated. Furthermore, a front-end server 230 may have at least a subset of the functions of camera adapter 120. According to the present embodiment, the sensor systems 110b to 110z have the same configuration as the sensor system 110a and therefore description of the configuration is not repeated. Note that the configurations of the sensor systems 110b to 110z do not necessarily have to be the same as that of the sensor system 110a, and the sensor systems 110 may have different configurations from one another.

The audio captured by the microphone 111a and the image captured by the camera 112a are subjected to image processing (described below) performed by the camera adapter 120a and thereafter are transmitted to the camera adapter 120b of the sensor system 110b through the daisy chain 170a. Similarly, the sensor system 110b transmits the captured audio and image to the sensor system 110c together with the image and audio obtained from the sensor system 110a.

By repeating the above-described operation, the images and audio acquired by the sensor systems 110a to 110z are transmitted from the sensor system 110z to the switching hub 180 by using the network 180b and thereafter are transmitted to the image computing server 200.

While the present embodiment is described with reference to the configuration in which the cameras 112a to 112z and the camera adapters 120a to 120z are separated, the cameras 112a to 112z and the camera adapters 120a to 120z may be integrated, respectively, in the same housing. In this case, each of the microphones 111a to 111z may be built into the corresponding integrated camera 112 or may be connected externally to the corresponding camera 112.

The configuration of the image computing server 200 and the operation performed by the image computing server 200 are described below. The image computing server 200 of the present embodiment processes the data acquired from the sensor system 110z. The image computing server 200 includes the front-end server 230, a database 250 (hereinafter also referred to as a "DB"), a back-end server 270, and a time server 290.

The time server 290 has a function of distributing time information and a synchronization signal and distributes the time information and the synchronization signal to the sensor systems 110a to 110z via the switching hub 180. Upon receiving the time information and the synchronization signal, the camera adapters 120a to 120z genlock the cameras 112a to 112z, respectively, on the basis of the time information and the synchronization signal and perform image frame synchronization. That is, the time server 290 synchronizes the image capture timings of the plurality of cameras 112. In this way, since the image processing system 100 can generate a virtual viewpoint image based on a plurality of captured images captured at the same time, the quality loss of the virtual viewpoint image caused by the deviation of the image capture timing can be prevented. According to the present embodiment, the time server 290 manages the time synchronization of a plurality of cameras 112, but the configuration is not limited thereto. Each of the cameras 112 or each of the camera adapters 120 may independently perform a time synchronization process.

The front-end server 230 reconstructs segmented transmission packets from the images and audio acquired from the sensor system 110z, converts the data format, and stores the segmented packets in the database 250 in accordance with the camera identifier, the data type, and the frame number.

The back-end server 270 receives the specification of a viewpoint from the virtual camera operation UI 330, reads the corresponding image and audio data out of the database 250 on the basis of the received viewpoint, and performs a rendering process to generate a virtual viewpoint image.

Note that the configuration of the image computing server 200 is not limited thereto. For example, at least two among the front-end server 230, the database 250, and the back-end server 270 may be integrated. In addition, at least one of the front-end server 230, the database 250, and the back-end server 270 may be provided in plurality. In addition, a device other than those described above may be included at any location within the image computing server 200. Furthermore, the end user terminal 190 or the virtual camera operation UI 330 may have at least a subset of the functions of the image computing server 200.

The image subjected to the rendering process is transmitted from the back-end server 270 to the end user terminal 190, and a user operating the end user terminal 190 can view the image and listen to the audio in accordance with the specified viewpoint. That is, the back-end server 270 generates virtual viewpoint content on the basis of the captured images (multi-viewpoint images) that are captured by a plurality of cameras 112 and the viewpoint information. More specifically, the back-end server 270 generates a virtual viewpoint content on the basis of, for example, image data of a predetermined area extracted, by the camera adapters 120, from images captured by the cameras 112 and a viewpoint specified through a user's operation. The back-end server 270 then provides the generated virtual viewpoint content to the end user terminal 190. The virtual viewpoint content according to the present embodiment is content that includes a virtual viewpoint image as the image of an object captured from the virtual viewpoint. That is, the virtual viewpoint image is an image that represents the appearance of the object from the specified viewpoint. The virtual viewpoint may be specified by the user or may be automatically specified on the basis of the result of image analysis or the like. That is, examples of a virtual viewpoint image include an arbitrary viewpoint image (a free-viewpoint image) corresponding to a viewpoint freely specified by the user. Furthermore, examples of a virtual viewpoint image include an image corresponding to a viewpoint specified by the user from among a plurality of candidates and an image corresponding to a viewpoint automatically specified by the device. Note that while the present embodiment is mainly described with reference to an example in which audio data is included in virtual viewpoint content, audio data does not necessarily have to be included in virtual viewpoint content. In addition, the back-end server 270 may compression-encode the virtual viewpoint image using a standard technology, such as H.264 or HEVC, and thereafter transmits the virtual viewpoint image to the end user terminal 190 by using the MPEG-DASH protocol. Alternatively, the virtual viewpoint image that is not compressed may be transmitted to the end user terminal 190. In particular, the compression-encoded virtual viewpoint image is intended to be used for the end user terminal 190 which is a smartphone or a tablet, and the non-compressed virtual viewpoint image is intended to be used for displays capable of displaying non-compressed images. That is, it should be noted that the image format can be changed in accordance with the type of end user terminal 190. The image transmission protocol is not limited to MPEG-DASH, and for example, HLS (HTTP Live Streaming) or other transmission methods may be used.

As described above, the image processing system 100 has three functional domains, that is, a video collection domain, a data storage domain, and a video generation domain. The video collection domain includes the sensor systems 110a to 110z, the data storage domain includes database 250, the front-end server 230, and the back-end server 270, and the video generation domain includes the virtual camera operation UI 330 and the end user terminal 190. Note that the configuration is not limited thereto. For example, the virtual camera operation UI 330 can acquire images directly from the sensor systems 110a to 110z. However, according to the present embodiment, instead of a method for directly acquiring images from the sensor systems 110a to 110z, a method for acquiring images through an intermediate data storage function is used. More specifically, the front-end server 230 converts the image data and audio data and the meta information of the data generated by the sensor systems 110a to 110z into the common schema and data type of the database 250. In this way, even if the cameras 112 of the sensor systems 110a to 110z are changed to cameras of another model, the front-end server 230 can adjust the difference and register the data in the database 250. This configuration can reduce the risk that the virtual camera operation UI 330 does not operate properly when the cameras 112 are replaced with cameras of another model.

The virtual camera operation UI 330 is configured to access the database 250 not directly but via the back-end server 270. A common process related to the image generation process is performed by the back-end server 270, and an operation UI-related process that differs from application to application is performed by the virtual camera operation UI 330. In this manner, the development of the virtual camera operation UI 330 can be focused on UI operation devices and UI functions required to operate a virtual viewpoint image to be generated. In addition, the back-end server 270 can add or delete the common process related to image generation processing in response to a request from the virtual camera operation UI 330. Thus, the back-end server 270 can flexibly respond to requests from the virtual camera operation UI 330.

As described above, in the image processing system 100, the back-end server 270 generates a virtual viewpoint image on the basis of the image data captured by a plurality of cameras 112 that capture the images of an object from a plurality of directions. Note that the image processing system 100 according to the present embodiment is not limited to the physical configuration described above and may be configured logically.

Figure 11A:
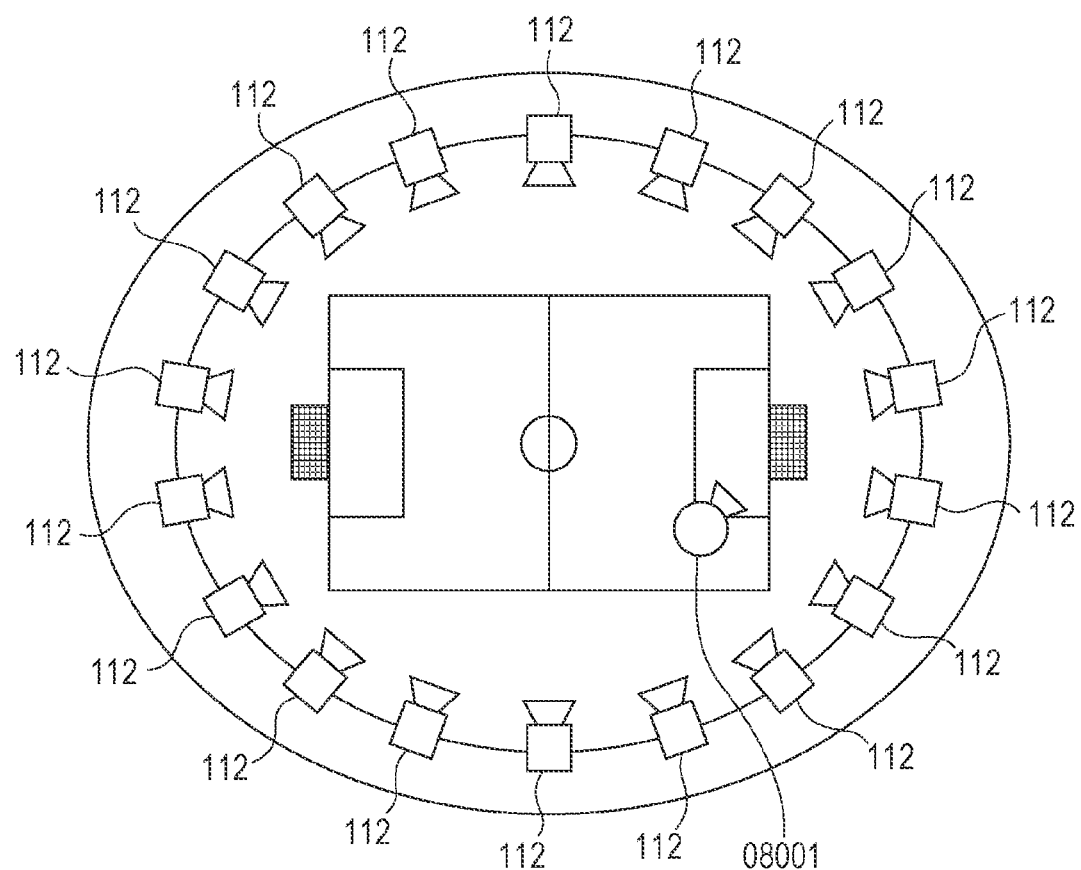
FIGS. 11A and 11B are schematic illustrations of how virtual viewpoint content is generated from a plurality of cameras installed in a stadium.
Figure 11B:
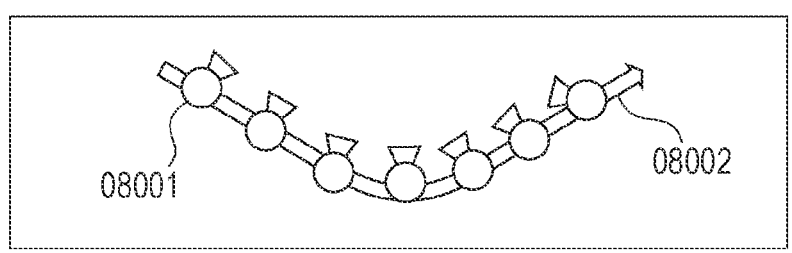

FIGS. 11A and 11B are schematic illustrations of generation of virtual viewpoint content by a plurality of cameras installed in a stadium. As illustrated in FIG. 11A, the cameras 112 are placed on a circle. For example, a virtual camera 08001 can generate a video as if the camera were near a goal. The term "virtual camera" refers to an imaginary camera for playing back a video from a specified viewpoint. The virtual camera can be installed at a different position than the installed camera 112, for example. Note that, in the following description, the virtual camera is also referred to as a "virtual viewpoint". That is, the position of the virtual viewpoint and the line-of-sight direction from the virtual viewpoint correspond to the position and the orientation of the virtual camera, respectively.

The video from the virtual camera 08001 is generated by performing image processing on the videos output from the plurality of installed cameras. To acquire a video viewed from a free viewpoint, the path of the virtual camera 08001 is managed by an operator. In FIG. 11B, a virtual camera path 08002 is information representing a change in the position and orientation of the virtual camera 08001.

Each of the cameras 112 is installed so that its optical axis is directed to a particular position (hereinafter referred to as a gaze point).

Figure 2:
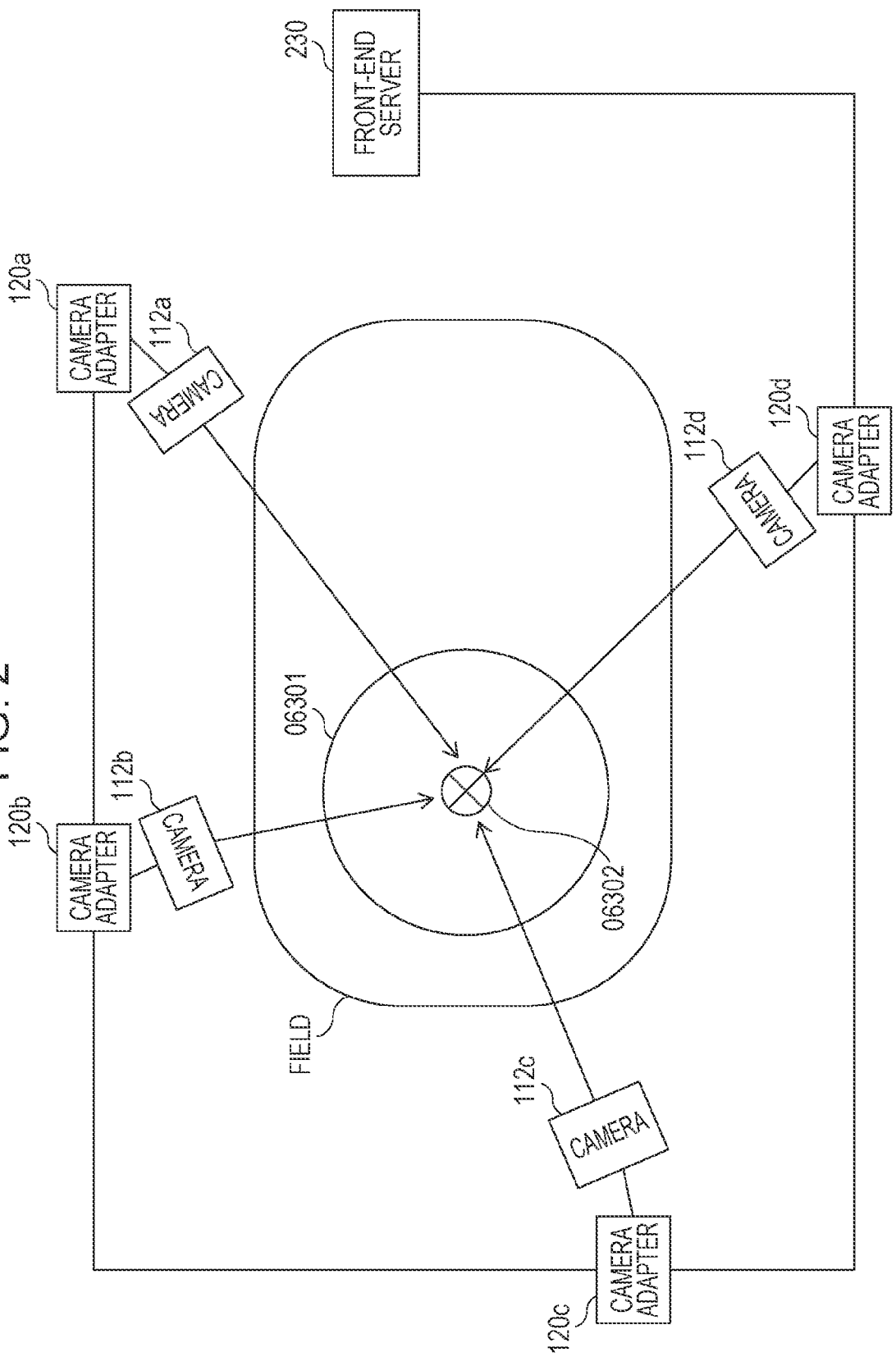
FIG. 2 is a schematic illustration of cameras and camera adapters installed in a stadium.

FIG. 2 is a schematic illustration of the cameras 112 and the camera adapters 120 installed in a stadium. Each of the cameras 112 is installed so that its optical axis is directed to a particular gaze point 06302. In FIG. 2, four cameras 112*a*, 112*b*, 112*c*, and 112*d* are installed, and one gaze point 06302 is set. By using these four cameras, a virtual viewpoint content can be generated inside a virtual viewpoint generation area 06301 at the center of which there is the gaze point 06302. In addition, the area outside the virtual viewpoint generation area 06301 is an area that is not captured by at least a subset of the four cameras.

Figure 3:
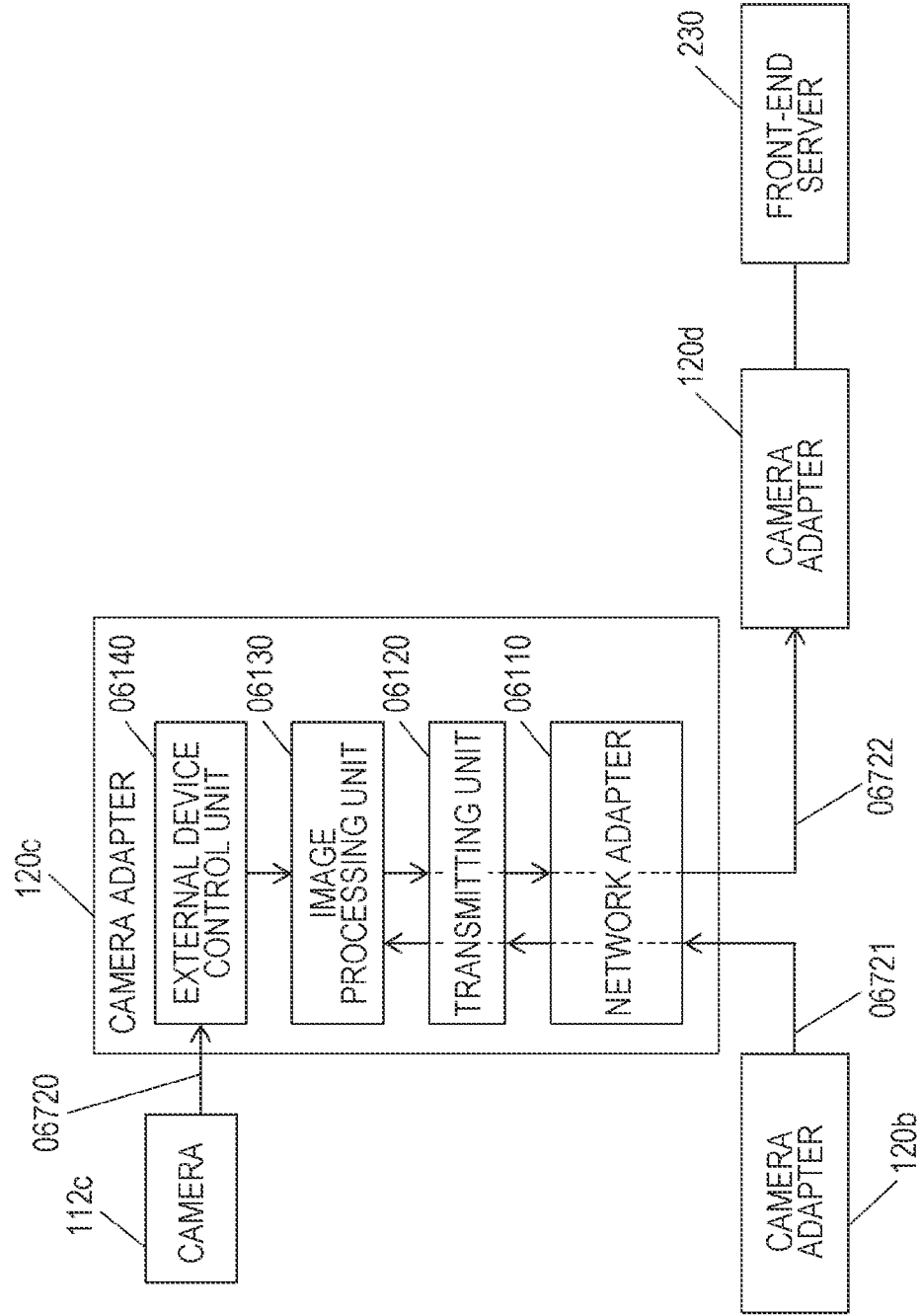
FIG. 3 is a schematic configuration diagram of the camera adapter.

The flow of the process to output data by the camera adapter 120 is described below with reference to FIG. 3. FIG. 3 illustrates the data flow among the camera adapters 120*b*, 120*c* and 120*d*. The camera adapter 120*b* is connected to the camera adapter 120*c*, and the camera adapter 120*c* is connected to the camera adapter 120*d*. In addition, the camera adapter 120*d* is connected to the front-end server 230.

The camera adapter 120 includes a network adapter 06110, a transmitting unit 06120, an image processing unit 06130, and an external device control unit 06140.

The network adapter 06110 has a function of performing data communication with other camera adapters 120, the front-end server 230, the time server 290, or the control station 310. Furthermore, the network adapter 06110 conforms to the Ordinay Clock defined in the IEEE 1588 standard, for example, and has a function of saving time stamps of data sent to and received from the time server 290 and a time control function of providing a time synchronized with the time server 290.

Input data 06721 is input from the camera adapter 120*b* to the transmitting unit 06120 via the network adapter 06110. In addition, captured image data 06720 from the camera 112*c* is image-processed by the image processing unit 06130 and is input to the transmitting unit 06120. Furthermore, the transmitting unit 06120 outputs, to the image processing unit 06130, the data 06721 input from the camera adapter 120*b*, compresses the data input from the image processing unit 6130, sets the frame rate for the data, packetizes the data, and outputs the data to the network adapter 06110. In addition, the transmitting unit 06120 conforms to the PTP (Precision Time Protocol) defined by the IEEE 1588 standard and has a time synchronization control function of performing a process related to time synchronization with the time server 290. Note that the time synchronization is not limited to PTP-based synchronization but may be performed using another similar protocol.

The image processing unit 06130 has a function of separating image data captured by the camera 112 via the camera control unit 06141 into foreground data and background data. In addition, the image processing unit 06130 has a function of generating video information related to a three-dimensional model (three-dimensional model information) on the basis of, for example, the principle of a stereo camera by using the separated foreground data and the foreground data received from another camera adapter 120.

The external device control unit 06140 has a function of controlling devices connected to the camera adapter 120, such as the camera 112, the microphone 111, and the pan head 113. The control of the camera 112 includes, but not limited to, setting and referencing of shooting parameters (the number of pixels, color depth, frame rate, white balance, and the like) and acquiring the state of the camera 112 (image capturing, stopped, synchronizing, or error).

The control of the camera 112 further includes starting/stopping image capture, acquiring focus-adjusted captured image, providing a synchronization signal, and setting the time. The control of the microphone 111 includes, but not limited to, adjusting the gain, acquiring the state, starting/stopping audio capture, and acquiring captured audio data. The control of the pan head 113 includes, but not limited to, controlling pan-tilt and acquiring the state.

Finally, the foreground and background data and the three-dimensional model information generated by the camera adapters 120*a* to 120*d* illustrated in FIG. 2 are sequentially transmitted through the camera adapters directly connected to the network and reach the front-end server 230 (described below). Note that at least part of the function of separating foreground data from background data and the function of generating three-dimensional model information may be performed by another device, such as the front-end server 230 (described below).

In this case, the camera adapter may be configured to transmit image data captured by the camera 112 instead of the foreground and background data and the three-dimensional model information.

Figure 4:
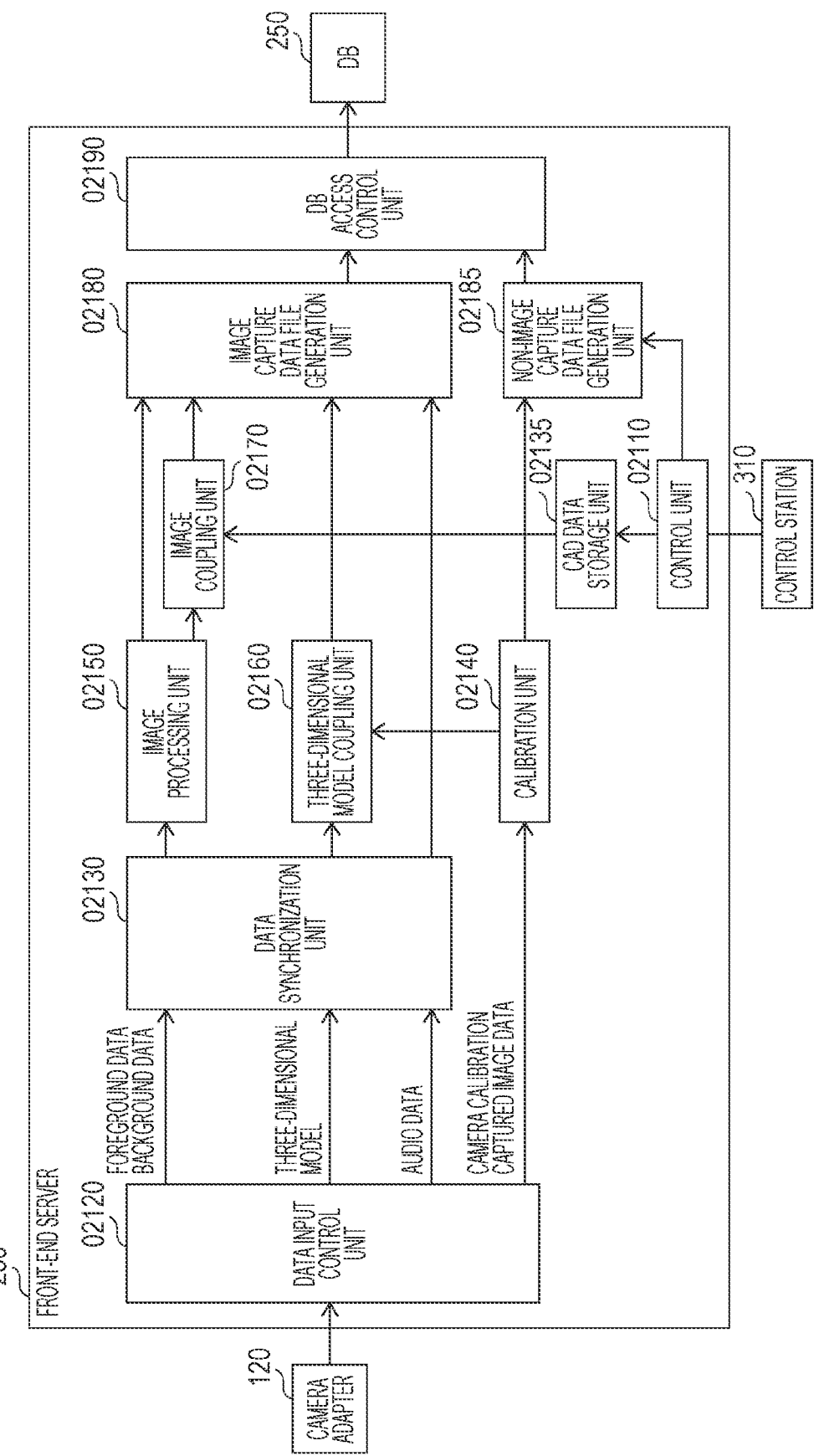
FIG. 4 is a schematic configuration diagram of a front-end server.

The front-end server 230 is described below with reference to FIG. 4. FIG. 4 is a schematic illustration of the functional blocks of the front-end server 230. A control unit 02110 includes hardware, such as a CPU, a DRAM, a storage medium (e.g., an HDD or NAND memory) that stores program data and variety of data, and an Ethernet (registered trademark) adaptor. The control unit 02110 controls each of the functional blocks of the front-end server 230 and performs overall control of the front-end server 230. In addition, the control unit 02110 receives control commands from the control station 310 via the Ethernet (registered trademark) adaptor and performs control of each of the functional blocks and input/output control of data, and the like. Furthermore, the control unit 02110 acquires stadium CAD data from the control station 310 via a network and transmits the stadium CAD data to a CAD data storage unit 02135 and a non-image capture data file generation unit 02185. The stadium CAD data is three-dimensional data representing the shape of the stadium. Note that the stadium CAD data can be any data representing a mesh model or another three-dimensional shape and is not limited to CAD format data.

A data input control unit 02120 is network-connected to the camera adapter 120 via the Ethernet (registered trademark) or the like. The data input control unit 02120 acquires the foreground and background data, the three-dimensional model, the audio data, and camera calibration captured image data from the camera adapter 120 via the network.

The data input control unit 02120 transmits the acquired foreground and background data to a data synchronization unit 02130 and transmits the camera calibration captured image data to a calibration unit 02140. The data input control unit 02120 further has a function of compressing and decompressing received data, data routing processing, and the like. Each of the control unit 02110 and the data input control unit 02120 has a communication function via a network, such as an Ethernet (registered trademark) network. However, the communication function may be shared. In this case, a technique may be used in which instructions from the control station 310 using control commands are received by the data input unit and are sent to the control unit 02110.

The data synchronization unit 02130 temporarily stores the data acquired from the camera adapter 120 in the DRAM and buffers the data until all of the foreground data, background data, audio data, and three-dimensional model data are gathered. Hereinafter, the foreground data, background data, audio data, and three-dimensional model data are collectively referred to as "image capture data". Meta information, such as routing information, time code information, and camera identifier, is added to the image capture data, and the attributes of the data are checked on the basis of the metadata information. In this manner, it is determined whether, for example, the data have the same time stamp and, thus, all the data are gathered. This is because it is not guaranteed that the order in which the network packets of the data are transmitted from each of the camera adapters 120 is the same as the order in which the packets are received and, thus, buffering is needed until all the data required for file generation are gathered.

When all the data are gathered, the foreground and background data, the three-dimensional model data, and the audio data are transmitted to an image processing unit 02150, a three-dimensional model coupling unit 02160, and the image capture data file generation unit 02180, respectively. Note that the data to be gathered here means the data needed to generate a file in the image capture data file generation unit 02180 (described below). Also note that the background data may be generated at a different frame rate than the foreground data.

For example, if the frame rate of the background data is 1 fps, one piece of background data is obtained every second. Therefore, for the time period during which the background data is not acquired, it may be determined that all the data are gathered even if the background data is missing. In addition, in the data synchronization unit 02130, if all the data are not gathered after a predetermined time has elapsed, the data synchronization unit 02130 provides a notification of non-data gathering. In addition, when storing data, the database 250, which is located downstream of the data synchronization unit 02130, stores information indicating data missing together with the camera number and the frame number. Thus, when the viewpoint is specified from the virtual camera operation UI 330 to the back-end server 270, the back-end server 270 can immediately and automatically send, before rendering, a message indicating whether a desired image can be formed from the image received from the camera 112 having gathered data. This configuration can reduce the load on the operator of the virtual camera operation UI 330 in terms of visual observation.

The CAD data storage unit 02135 stores, in a DRAM or a storage medium (e.g., an HDD or a NAND memory), the three-dimensional data representing the shape of the stadium received from the control unit 02110. In addition, the CAD data storage unit 02135 transmits the stored stadium shape data to an image coupling unit 02170 upon receiving a request for the stadium shape data.

The calibration unit 02140 performs a camera calibration operation and transmits the camera parameters obtained by the calibration to a non-image capture data file generation unit 02185 (described below). At the same time, the calibration unit 02140 stores the camera parameters in its own storage area and provides the camera parameter information to the three-dimensional model coupling unit 02160 (described below).

The image processing unit 02150 performs processing, such as matching of colors and luminance values among cameras, a development process when RAW image data is input, and correction of camera lens distortion, on the images of the foreground data and background data. Thereafter, the foreground data and the background data subjected to the image processing are transmitted to the image capture data file generation unit 02180 and the image coupling unit 02170, respectively.

The three-dimensional model coupling unit 02160 couples the three-dimensional model data acquired from the camera adapters and having the same time stamp by using the camera parameters generated by the calibration unit 02140. In addition, the three-dimensional model coupling unit 02160 uses a technique called VisualHull to generate three-dimensional model data of the foreground data for the entire stadium. The generated three-dimensional model is transmitted to the image capture data file generation unit 02180.

The image coupling unit 02170 acquires the background data from the image processing unit 02150, acquires the three-dimensional geometric data of the stadium from the CAD data storage unit 02135, and identifies the position of an image appearing in the background data in the coordinates of the acquired three-dimensional geometric data of the stadium. When the position of each background data item can be identified with respect to the coordinates of the three-dimensional geometric data of the stadium, the background data items are coupled into one background data item. Note that the generation of the three-dimensional geometric data of the background data may be performed as a process performed by the back-end server 270.

The image capture data file generation unit 02180 receives audio data from the data synchronization unit 02130, foreground data from the image processing unit 02150, three-dimensional model data from the three-dimensional model coupling unit 02160, and coupled background data from the image coupling unit 02170. In addition, the image capture data file generation unit 02180 transmits the acquired data to a DB access control unit 02190. The file generated by the image capture data file generation unit 02180 may be a file including image capture data items of the same type each associated with an image capture time or a file including all the image capture data items each having the same image capture time.

The non-image capture data file generation unit 02185 acquires the camera parameters and the three-dimensional geometric data of the stadium from the calibration unit 02140 and the control unit 02110, respectively, and converts the acquired data into the file format. Thereafter, the non-image capture data file generation unit 02185 transmits the data to the DB access control unit 02190. Note that the camera parameter or the stadium shape data, which are to be input to the non-image capture data file generation unit 02185, is individually converted into a file format. If either one of the camera parameter or the stadium shape data is received, the data is individually transmitted to the DB access control unit 02190.

The DB access control unit 02190 is connected to the database 250 by high-speed communication interface, such as InfiniBand and transmits the files received from the image capture data file generation unit 02180 and the non-image capture data file generation unit 02185 to the database 250.

Figure 5:
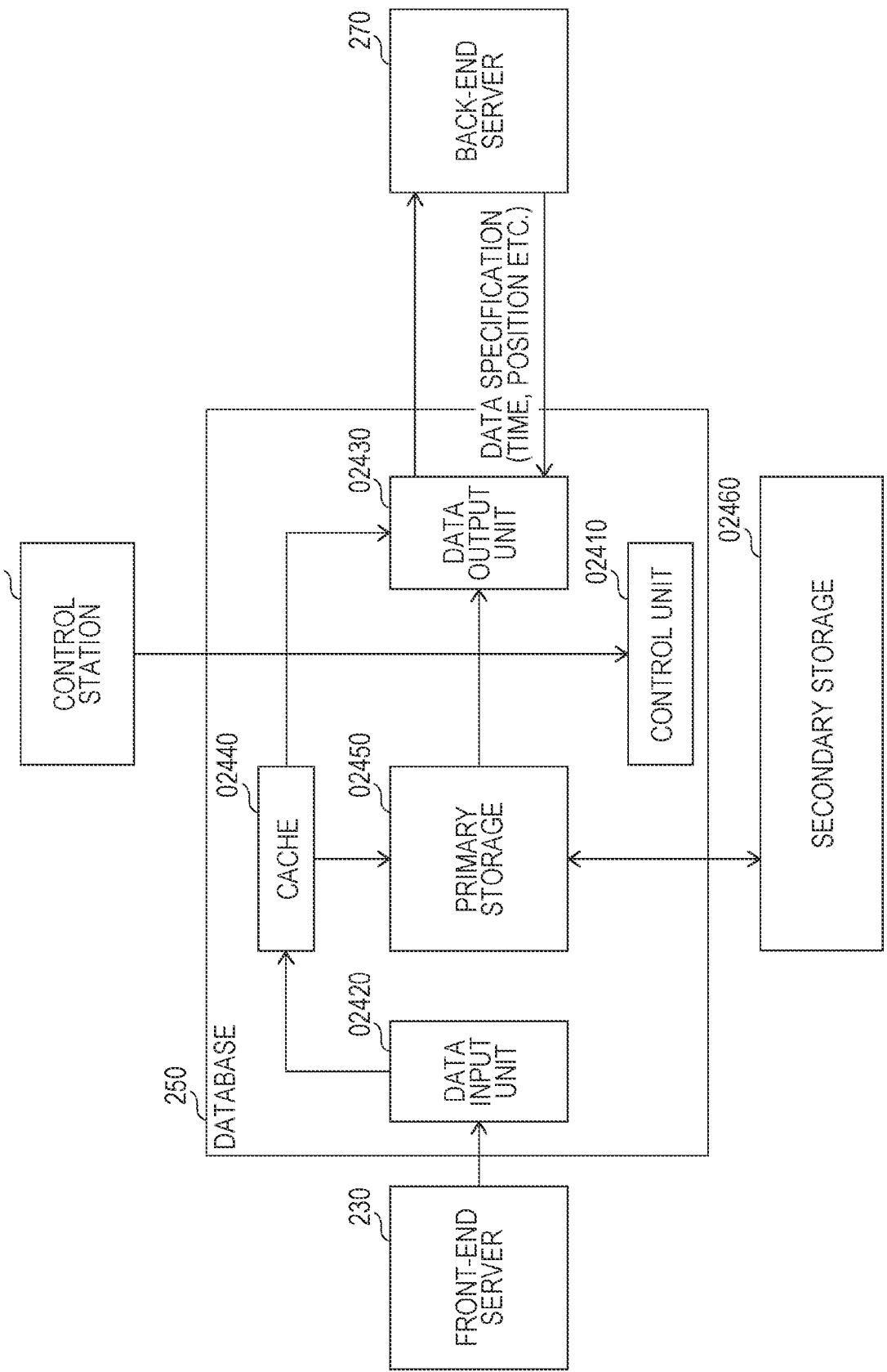
FIG. 5 is a schematic configuration diagram of a database.

The database 250 is described below with reference to FIG. 5. FIG. 5 is a schematic illustration of the functional blocks of the database 250. A control unit 02410 includes hardware, such as a CPU, a DRAM, a storage medium (e.g., an HDD or NAND memory) that stores program data and variety of data, and the Ethernet (registered trademark) adaptor. The control unit 02410 controls each of the functional blocks of the database 250 and performs overall control of the database 250.

A data input unit 02420 receives a file of the captured image data and a file of non-captured image data acquired from the front-end server 230 via high-speed communication, such as InfiniBand. The received file is transmitted to a cache 02440. At this time, the data input unit 02420 reads the meta information of the captured image data and generates a database table on the basis of the information items recorded as the meta information (e.g., the time code information, routing information, and camera identifier) so as to enable access to the acquired data.

A data output unit 02430 determines in which of the cache 02440, a primary storage 02450, and a secondary storage 02460 (described below) the data requested by the back-end server 270 is stored via high-speed communication, such as InfiniBand. Thereafter, the data output unit 02430 reads the stored data and transmits the data to the back-end server 270.

The cache 02440 includes a storage device, such as a DRAM, capable of achieving high-speed input/output throughput and stores, in the storage device, the captured image data and the non-captured image data acquired from the data input unit 02420. A certain amount of stored data is retained. When data exceeding the certain amount is input, the oldest data is written to the primary storage 02450 as needed, and the written data is overwritten with new data. Note that the certain amount of data stored in the cache 02440 is the captured image data for at least one frame. By caching the data, the throughput in the database 250 can be minimized when the video rendering process is performed in the back-end server 270, so that the most recent video frames can be continuously rendered with low delay. In this case, to achieve the above-described goal, the cached data need to contain the background data. When a frame of the captured image data that does not contain background data is cached, the background data is not updated and is held in the cache without any change. The capacity of a cacheable DRAM is determined by the predetermined cache frame size set for the system or by a command sent from the control station. Note that the non-captured image data is immediately copied to the primary storage because the input/output operation is not frequently performed, and high-speed throughput is not required before a game. The cached data is read by the data output unit 02430.

The primary storage 02450 is configured by, for example, connecting storage media, such as SSDs, in parallel for high speed data transfer so that a large amount of data can be written by the data input unit 02420 and data can be read by the data output unit 02430 at the same time. The data stored in the cache 02440 are sequentially written to the primary storage 02450 in the order of oldest to newest.

The secondary storage 02460 is composed of, for example, an HDD or a tape medium and is required to be an inexpensive large-capacity medium suitable for long-term data storage, as compared with the high-speed primary storage. After image capture is completed, the data stored in the primary storage 02450 is written to the secondary storage 02460 for data backup.

The back-end server 270 is described below with reference to FIG. 6.

Figure 6:
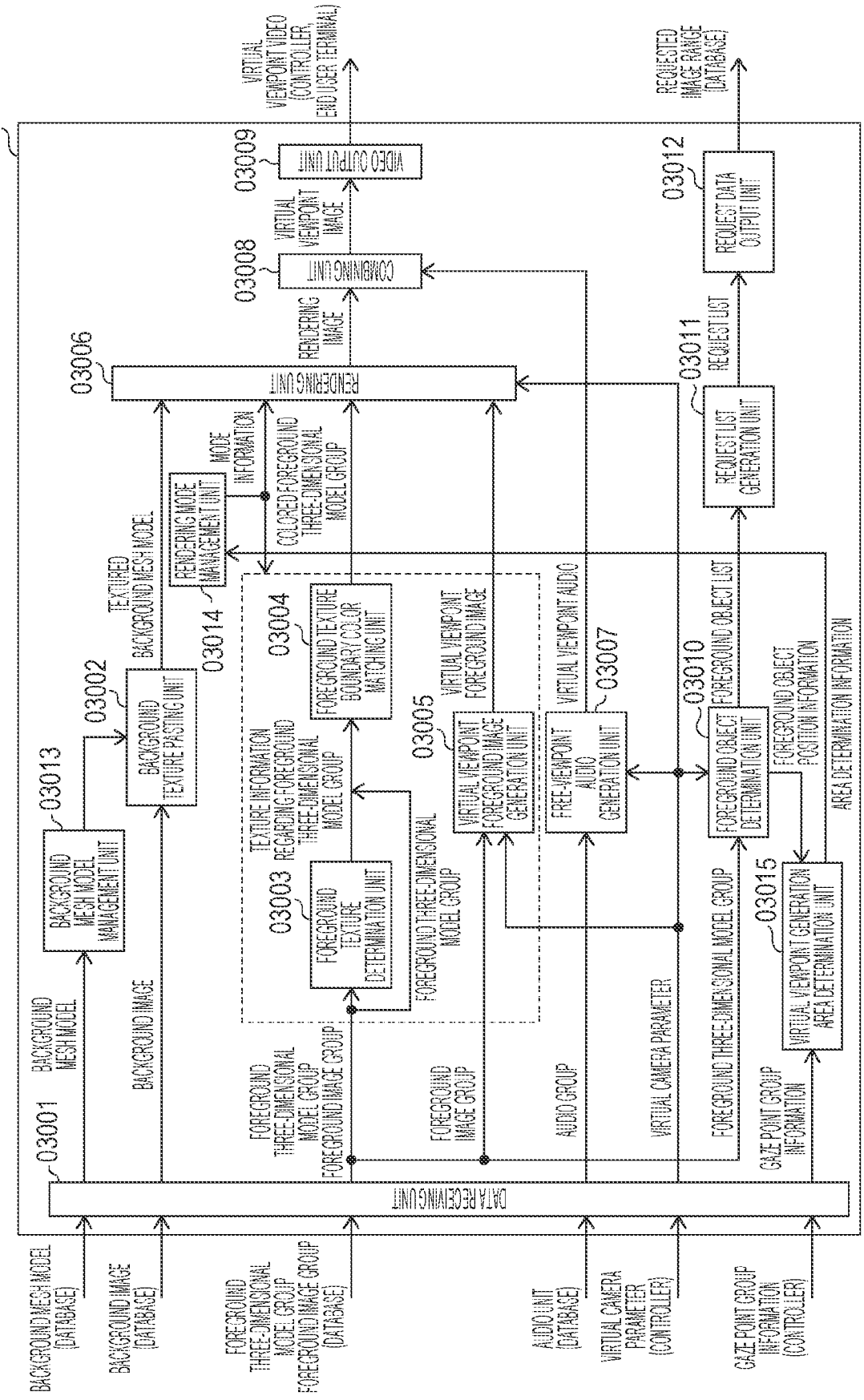
FIG. 6 is a schematic configuration diagram of a back-end server according to a first embodiment.

FIG. 6 illustrates the configuration of the back-end server 270 according to the present embodiment. The back-end server 270 includes a data receiving unit 03001, a background texture pasting unit 03002, a foreground texture determination unit 03003, a foreground texture boundary color matching unit 03004, and a virtual viewpoint foreground image generation unit 03005. The back-end server 270 further includes a rendering unit 03006, a free-viewpoint audio generation unit 03007, a combining unit 03008, a video output unit 03009, a foreground object determination unit 03010, and a request list generation unit 03011. The back-end server 270 further includes a request data output unit 03012, a background mesh model management unit 03013, a rendering mode management unit 03014, and a virtual viewpoint generation area determination unit 03015.

The data receiving unit 03001 receives data transmitted from the database 250 and the controller 300. The data receiving unit 03001 receives, from the database 250, three-dimensional data representing the shape of the stadium (hereinafter referred to as a "background mesh model"), foreground data, background data, a three-dimensional model of the foreground data (hereinafter referred to as a "foreground three-dimensional model"), and audio. Furthermore, the data receiving unit 03001 receives the virtual camera parameters and gaze point group information from the controller 300. The term "virtual camera parameters" refers to viewpoint information representing the position of a virtual viewpoint, the line-of-sight direction from the virtual viewpoint, and the like. The virtual camera parameters are represented, for example, by a matrix of external parameters and a matrix of internal parameters.

As indicated by the schematic illustration of a stadium illustrated in FIG. 2, the gaze point group information includes camera information regarding the four cameras 112a, 112b, 112c, and 112d installed so that the optical axis of each of the four cameras 112a, 112b, 112c, and 112d is directed to the gaze point and the virtual viewpoint generation area information corresponding to the camera group The background texture pasting unit 03002 pastes, as a texture, the background data to the shape of three-dimensional space represented by the background mesh model acquired from the background mesh model management unit 03013 so as to generate a textured background mesh model. The term "mesh model" refers to data, such as CAD data, representing the shape of three-dimensional space by using a set of surfaces. The term "texture" refers to an image pasted to a surface of an object to build the texture of the surface.

The foreground texture determination unit 03003 determines the texture information of the foreground three-dimensional model from the foreground data and the foreground three-dimensional model group. The foreground texture boundary color matching unit 03004 performs color matching at texture boundaries by using the texture information regarding each of the foreground three-dimensional model and each of three-dimensional groups and generates a colored foreground three-dimensional model group for each of foreground objects.

The virtual viewpoint foreground image generation unit 03005 perspectively transforms the foreground data group into the appearance viewed from the virtual viewpoint on the basis of on the gaze point group information received from the virtual viewpoint generation area determination unit 03015 and the virtual camera parameters. The rendering unit 03006 renders the background data and the foreground data on the basis of the rendering mode held by the rendering mode management unit 03014 and generates a combined virtual viewpoint image.

According to the present embodiment, model-based rendering (MBR) and image-based rendering (IBR) are employed as the rendering mode. MBR is a technique to use a three-dimensional shape (model) of the target scene obtained by a three-dimensional shape restoration method, such as the silhouette volume intersection or the Multi-View-Stereo (MVS), and generate, as an image, the appearance of the scene viewed from a virtual viewpoint. IBR is a technique to transform and combine an input image group obtained by capturing the target scene from a plurality of viewpoints and generate a free-viewpoint image that reproduces the appearance viewed from a virtual viewpoint. When the foreground texture generation method is MBR, a background mesh model and a foreground three-dimensional model group generated by the foreground texture boundary color matching unit 03004 are combined to generate a combined view model and generate, using the combined view model, an image viewed from the virtual viewpoint. When the foreground texture generation method is IBR, a background image viewed from the virtual viewpoint is generated from the background texture model, and the foreground image generated by the virtual viewpoint foreground image generation unit 03005 is combined with the background image to generate a combined virtual viewpoint image viewed from the virtual viewpoint.

The rendering mode management unit 03014 manages the mode information indicating the foreground texture generation method uniquely determined for the system. According to the present embodiment, the rendering mode management unit 03014 selects either IBR or MBR foreground texture in accordance with the determination information output from the virtual viewpoint generation area determination unit 03015 and outputs the selected foreground texture as rendering mode information.

The free-viewpoint audio generation unit 03007 generates, from the audio group and the virtual camera parameters, audio that can be heard at a virtual viewpoint.

The combining unit 03008 combines the image group generated by the rendering unit 03006 with the audio generated by the free-viewpoint audio generation unit 03007 to generate a video.

The video output unit 03009 outputs the video to the controller 300 and the end user terminal 190 by using Ethernet (registered trademark). However, the transmission interface with the outside world is not limited to Ethernet (registered trademark), and a signal transmission interface such as SDI, DisplayPort, or HDMI (registered trademark) may be used.

The foreground object determination unit 03010 determines a foreground object group to be displayed on the basis of the virtual camera parameters and the position information regarding the foreground objects indicating the spatial positions of the foreground objects included in the foreground three-dimensional model and outputs a foreground object list. That is, the foreground object determination unit 03010 performs a process of mapping the video information for the virtual viewpoint onto the physical camera 112. The virtual viewpoint has different mapping results in accordance with the rendering mode set by the rendering mode management unit 03014. Therefore, it should be noted that although not illustrated, the foreground object determination unit 03010 includes a plurality of control units each determining a foreground object and performs control in conjunction with the rendering mode.

The request list generation unit 03011 generates a list requesting, from the database 250, the foreground data group and the foreground three-dimensional model group corresponding to the foreground object list at the specified time, as well as the background image and audio data.

For a foreground object, the request list generation unit 03011 requests, from the database 250, the data in consideration of the virtual viewpoint. However, for a background image and audio data, the request list generation unit 03011 requests all the data of the frame. In addition, after the back-end server 270 is activated, the request list generation unit 03011 generates a background mesh model request list until the background mesh model is obtained. The request data output unit 03012 outputs a data request command to the database 250 on the basis of the input request list.

The background mesh model management unit 03013 stores the background mesh model received from the database 250.

The virtual viewpoint generation area determination unit 03015 stores the gaze point group information set by the controller 300. In addition, the virtual viewpoint generation area determination unit 03015 determines whether the foreground object to be displayed is inside or outside the virtual viewpoint generation area on the basis of the foreground object position information output from the foreground object determination unit 03010 and outputs the determination result as area determination information. In the schematic illustration of the stadium illustrated in FIG. 2, a gaze point group is generated by four cameras 112a, 112b, 112c, and 112d installed so that the optical axes of the cameras are directed to the gaze point. The controller 300 sets the camera information forming the gaze point group and the virtual viewpoint generation area information corresponding to the camera group as gaze point group information. Note that the number of cameras installed in the stadium is not limited to four, and the number of cameras forming the gaze point group may be any number greater than or equal to one. In addition, cameras forming other gaze point groups may be further installed.

Figure 7:
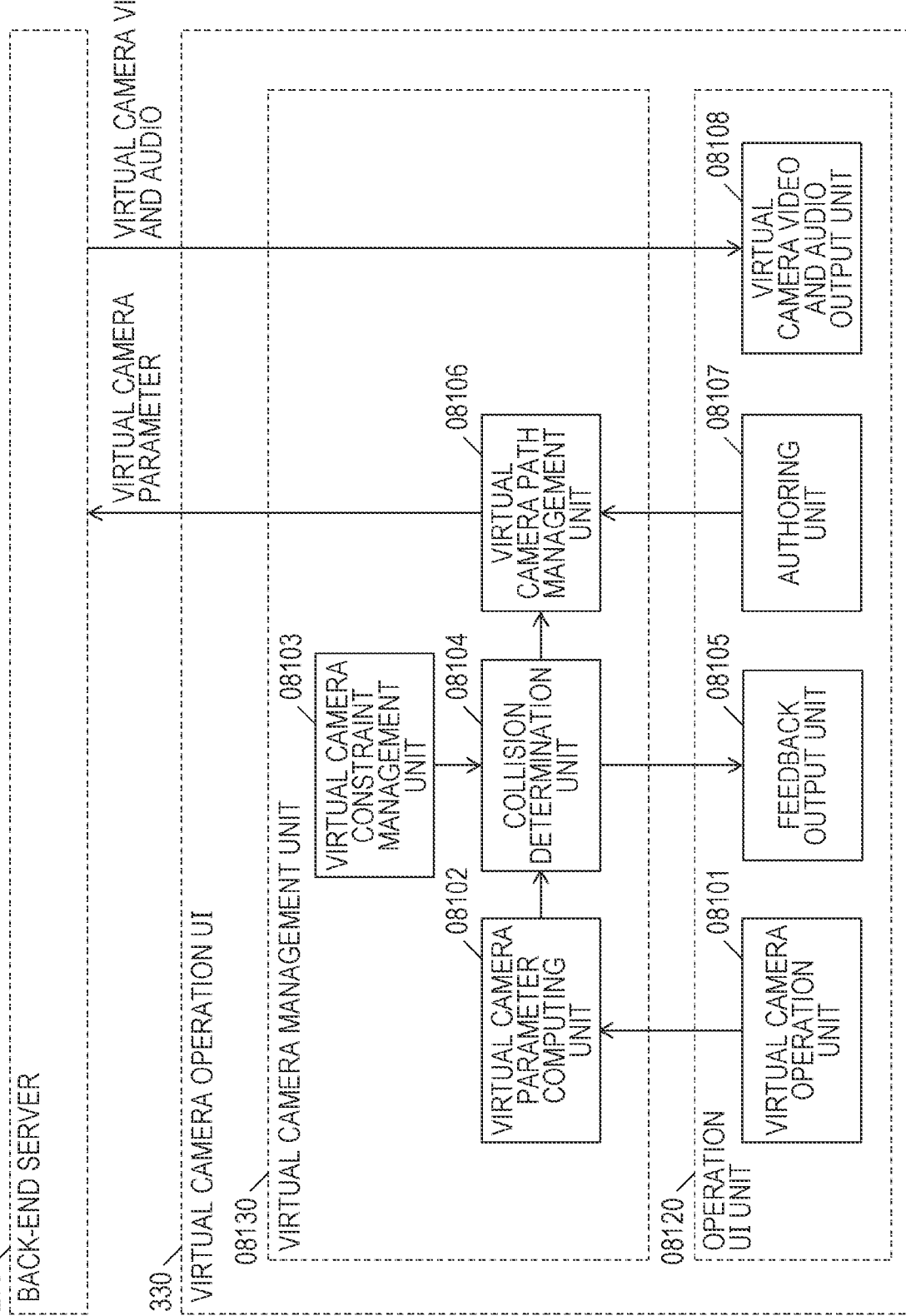
FIG. 7 is a schematic configuration diagram of a virtual camera operation UI.

FIG. 7 is a block diagram of the functional configuration of the virtual camera operation UI 330. The virtual camera operation UI 330 includes a virtual camera management unit 08130 and an operation UI unit 08120. The two units may be implemented on the same device or may be implemented as a server and a client. For example, when the virtual camera operation UI 330 is used as the UI of a broadcasting station, the virtual camera management unit 08130 and the operation UI unit 08120 may be implemented in a workstation in a relay van and may be provided as an apparatus. In contrast, when the virtual camera operation UI 330 is used as an end user terminal 190, the virtual camera management unit 08130 may be implemented in a web server, and the operation UI unit 08120 may be implemented in the end user terminal 190, for example.

A virtual camera operation unit 08101 processes an operation performed on the virtual camera 08001 by an operator. Examples of an operation performed by the operator include, for example, a position change (movement), an orientation change (rotation), and a zoom magnification change. To operate the virtual camera 08001, the operator uses an input device, such as a joystick, a jog dial, a touch panel, a keyboard, or a mouse. Correspondence between the type of an input operation performed on the input device and the operation performed by the virtual camera 08001 is determined in advance.

For example, the "W" key of the keyboard is associated with the operation of moving the virtual camera 08001 forward by one meter. In addition, the operator can operate the virtual camera 08001 by specifying a trajectory. For example, the operator specifies the trajectory of the virtual camera 08001 that moves around a goalpost by drawing a circle on a touch pad. The virtual camera 08001 moves around the goalpost along the specified trajectory. Furthermore, the orientation of the virtual camera 08001 is changed so that the virtual camera 08001 is always directed to the goalpost. The virtual camera operation unit 08101 can be used to generate live video and replay video. When a replay video is generated, the time is manipulated in addition to the position and orientation of the camera. In the replay video, for example, time can be stopped and, thereafter, the virtual camera 08001 can be moved.

A virtual camera parameter computing unit 08102 calculates virtual camera parameters representing the position, orientation, and the like of the virtual camera 08001. As virtual camera parameters, for example, a matrix of external parameters and a matrix of internal parameters are used. Note that the position and orientation of the virtual camera 08001 are included in the external parameters, and the zoom value is included in the internal parameters.

A virtual camera constraint management unit 08103 manages constraints on the position, orientation, zoom value, and the like of the virtual camera 08001. Unlike a camera, the virtual camera 08001 can freely move its viewpoint and generate videos. However, it is not that the virtual camera 08001 can generate videos from all viewpoints. For example, when the virtual camera 08001 is turned in a direction in which the image of an object is not captured by any of cameras, the virtual camera 08001 cannot acquire the video. In addition, the image quality decreases when the zoom magnification is increased. The zoom magnification within a range in which a certain standard of image quality is maintained may be set as a virtual camera constraint. Virtual camera constraints are calculated in advance on the basis of, for example, the camera positions.

A collision determination unit 08104 determines whether the virtual camera 08001 satisfies the virtual camera constraints. The collision determination unit 08104 determines whether a new virtual camera parameter calculated by the virtual camera parameter computing unit 08102 satisfies the constraints. If the constraints are not satisfied, the operation performed by the operator is canceled, and the virtual camera 08001 is stopped at a position that satisfies the constraints or is returned to its original position, for example.

A feedback output unit 08105 feeds back the determination result of the collision determination unit 08104 to the operator. If the operation performed by the operator does not satisfy the virtual camera constraints, the feedback output unit 08105 sends, to the operator, a message indicating the violation of the constraints. For example, suppose that the operator attempts to move the virtual camera 08001 upward, but the destination does not satisfy the virtual camera constraints. In this case, the feedback output unit 08105 sends, to the operator, a message saying that the virtual camera 08001 cannot be moved any further forward. Examples of the message include sound, a text message, a change in a screen color, and locking of virtual camera operation unit 08101. Furthermore, if the virtual camera is automatically returned to the position at which the virtual camera can be moved, the operator's ease of operation is increased.

A virtual camera path management unit 08106 manages the path of the virtual camera 08001 operated by the operator. A virtual camera path 08002 is a series of information items each representing the position and orientation of the virtual camera 08001 for one frame. For example, the virtual camera parameter is used as information representing the position and orientation of the virtual camera 08001. For example, when the frame rate is set to 60 frames/second, the information for one second is a series of 60 virtual camera parameters. The virtual camera path management unit 08106 transmits the virtual camera parameters already determined by the collision determination unit 08104 to the back-end server 270.

The back-end server 270 uses the received virtual camera parameters and generate virtual camera video and audio. In addition, the virtual camera path management unit 08160 has a function of adding virtual camera parameters to the virtual camera path 08002 and holding the virtual camera path 08002. For example, when virtual camera video and audio for one hour are generated using the virtual camera UI 330, the virtual camera parameters for one hour are stored as the virtual camera path 08002. By storing the virtual camera path, virtual camera video and audio can be re-generated later by using the virtual camera path accumulated in the secondary storage 02460 of the database. That is, a virtual camera path generated by an operator who performs advanced virtual camera operations and the video information accumulated in the secondary storage 02460 become reusable. In addition, as a virtual camera path, a plurality of scenes can be accumulated in the virtual camera management unit 08130 in a selectable manner. When the plurality of scenes are accumulating in the virtual camera management unit 08130, meta information, such as the scripts of the scenes, the elapsed time of the game, the specified times before and after the scene, and player information, can be input and accumulated at the same time. These virtual camera paths are sent to the back-end server 270 as virtual camera parameters.

As a result, the end user terminal 190 can select a virtual camera path from the scene name, player, and game elapsed time by requesting virtual camera path selection information from the back-end server 270. At this time, the back-end server 270 sends, to the end user terminal 190, selectable virtual camera path candidates, and the end-user selects a desired virtual camera path from among the candidates at the end user terminal 190. Thereafter, by requesting the back-end server 270 to generate video corresponding to the virtual camera path selected at the end user terminal 190, the user can interactively enjoy a video distribution service.

An authoring unit 08107 provides an editing function when the operator generates a replay video. Part of the virtual camera path 08002 is extracted from the virtual camera path management unit 08106 as the initial value of the virtual camera path 08002 for the replay video. As described above, the virtual camera path management unit 08106 contains, as meta information, the scene name, the player, the elapsed time, and the specified time before and after the scene. For example, the authoring unit 08107 retrieves a virtual camera path 08002 having a scene name of "goal scene" and having a specified time before and after the scene of 10 seconds in total. In addition, the authoring unit 08107 sets the playback speed for the edited camera path. For example, slow-motion replay is set for the virtual camera path 08002 in which the ball is flying toward the goal. When changing the video to a video from a different viewpoint, that is, when changing the virtual camera path 08002, the operator operates the virtual camera 08001 again by using the virtual camera operation unit 08101.

A virtual camera video and audio output unit 08108 outputs the virtual camera video and audio received from the back-end server 270. The operator operates the virtual camera 08001 while checking the output video and audio.

Figure 8:
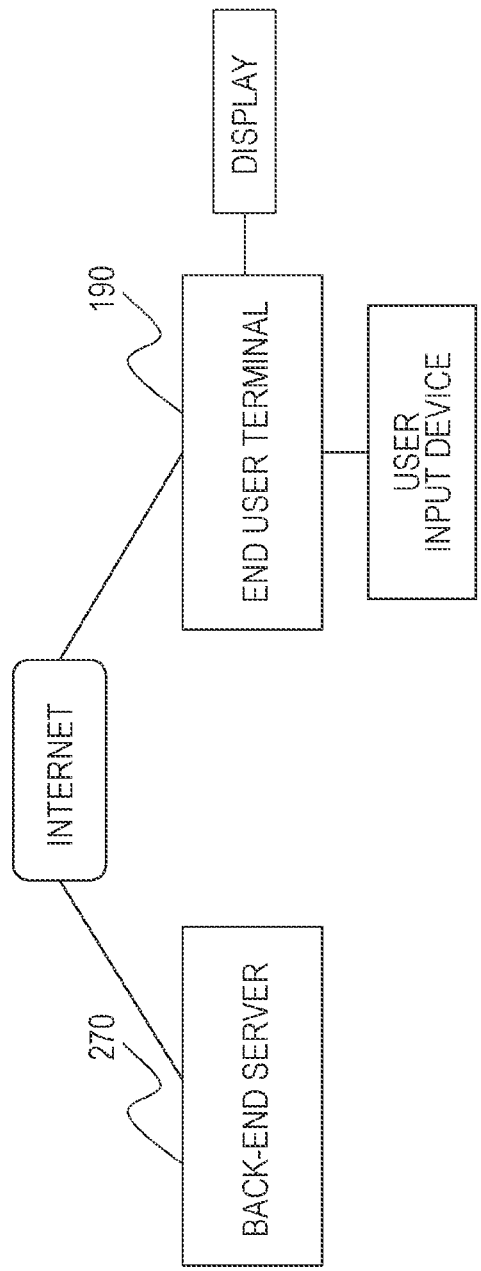
FIG. 8 is a connection configuration diagram of an end user terminal.

The end user terminal used by a viewer is described below. FIG. 8 is a connection configuration diagram of the end user terminal 190.

The end user terminal 190 in which the service application operates is, for example, a personal computer (PC). Note that the end user terminal 190 is not limited to a PC, and may be a smartphone, a tablet, or a high-definition large display.

The end user terminal 190 is connected to the back-end server 270 that distributes video via an Internet network. For example, a PC is connected to a router and the Internet network via a local area network (LAN) cable or wireless LAN.

In addition, a display on which the viewer watches a sports broadcast video and a user input device that receives a viewer's operation, such as an operation to change the viewpoint, are connected to the PC. For example, the display is a liquid crystal display and is connected to the PC via a DisplayPort cable.

Examples of a user input device include a mouse and a keyboard, which are connected to the PC via a universal serial bus (USB) cable.

Some issues to be addressed in the present embodiment are described below. For example, when the position and orientation of the virtual camera are specified such that a particular object is included in the virtual viewpoint image, the particular object may be positioned outside the virtual viewpoint generation area 06301. In this case, the virtual viewpoint image is an image including an area outside the virtual viewpoint generation area 06301.

The number of cameras that capture the image of the area outside the virtual viewpoint generation area 06301 may be less than the number of cameras included in the camera group. In this case, if an attempt is made to generate a virtual viewpoint image using MBR, the quality of the three-dimensional model may be degraded due to the small number of cameras, and as a result, the image quality of the virtual viewpoint image may be degraded.

Figure 9:
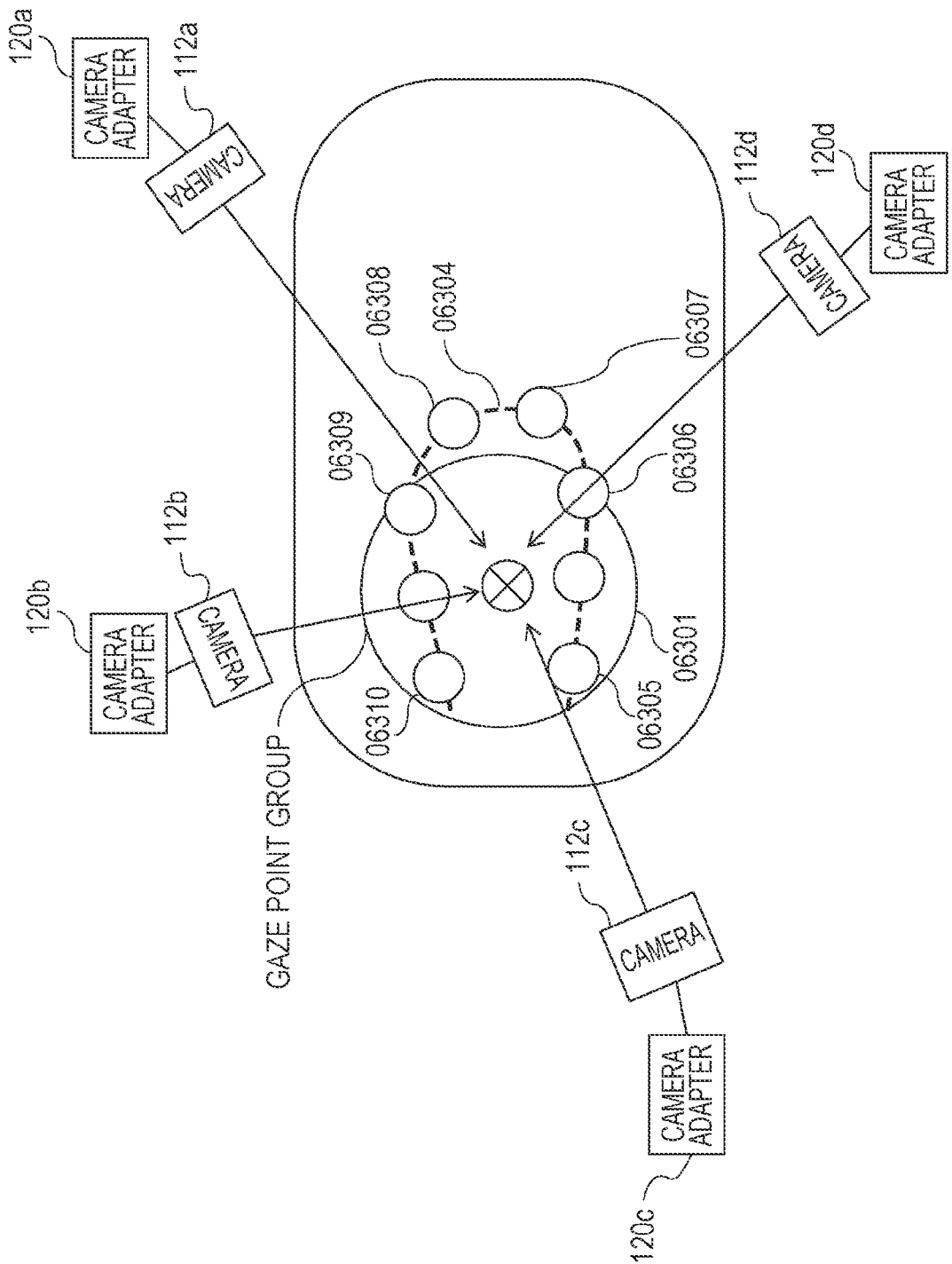
FIG. 9 is a first schematic illustration of the relationship between an object moving in a stadium and a gaze point group.

The processing for addressing the above-mentioned issue is described with reference to FIGS. 9 and 10. FIG. 9 is a schematic illustration of the relationship between an object, such as a person or a ball moving on a field, and a gaze point group. The object is an object for which a virtual viewpoint image is to be generated.

In FIG. 9, an object denoted by a white circle is initially located at a position 06305 and moves to a position 06310 along a trajectory 06304. The operator operates the virtual camera operation unit 08101 of the virtual camera operation UI 330 illustrated in FIG. 7 to operate the virtual camera 08001 so as to chase the object on the trajectory 06304. In the back-end server 270 illustrated in FIG. 6, when the virtual camera parameters based on the operator's operation are input from the controller 300, the virtual viewpoint video is generated in accordance with the virtual camera parameters.

Figure 10:
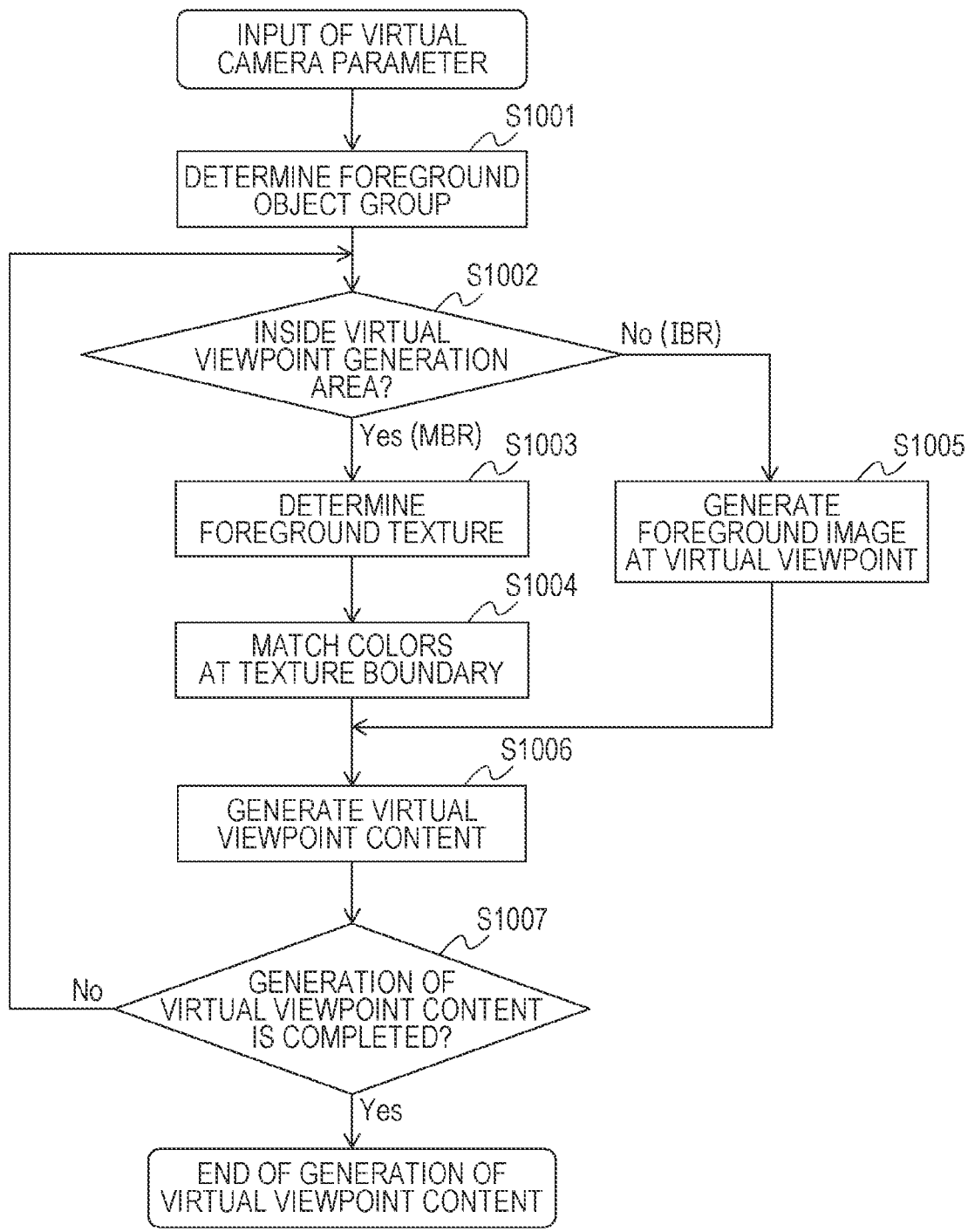
FIG. 10 is a flowchart illustrating the flow of processing performed by the back-end server according to one or more aspects of the present disclosure.

FIG. 10 is a flowchart illustrating the flow of processing for generating virtual viewpoint content in the back-end server 270 when virtual camera parameters based on the operator's operation are input from the controller 300.

First, the foreground object determination unit 03010 determines a foreground object group to be used for display on the basis of the input virtual camera parameters and the foreground three-dimensional model group transmitted from the database 250 (S1001). Subsequently, the virtual viewpoint generation area determination unit 03015 determines whether the foreground object to be generated is inside or outside the virtual viewpoint generation area on the basis of the gaze point group information and the foreground object position information (S1002). In the schematic illustration in FIG. 9, since the object is initially located at the position 06305 inside the virtual viewpoint generation area 06301, the rendering mode management unit 03014 is notified that the foreground object to be generated is inside of the virtual viewpoint generation area.

The rendering mode management unit 03014 determines the foreground texture generation method in accordance with the determination result received from the virtual viewpoint generation area determination unit 03015. In this example, if the generated foreground object is inside the virtual viewpoint generation area, MBR is selected for rendering since the number of cameras that can be used for virtual viewpoint generation is sufficient. However, if the foreground object to be generated is outside the virtual viewpoint generation area, IBR is selected for rendering since the number of cameras that can be used for virtual viewpoint generation is limited. The rendering unit 03006 transforms and combines foreground images from a limited number of cameras and generates a foreground image viewed from a virtual viewpoint. Note that the limited number of cameras used at this time are, for example, a subset (one or more) of the cameras that capture the images of the virtual viewpoint generation area. Also note that the camera that is used is a camera that includes the object within its image capturing range.

If, in S1002, it is determined that the rendering method is MBR, the foreground texture determination unit 03003 determines the foreground texture on the basis of the foreground three-dimensional model and the foreground image group (S1003). Thereafter, the foreground texture boundary color matching unit 03004 performs color matching of the determined foreground texture at the texture boundary (S1004). This step is required because the textures of the foreground three-dimensional model are extracted from a plurality of foreground image groups and, thus, the colors of the textures differ from one another due to the difference in image capture conditions of the foreground images. After the above-described processing is performed, the rendering unit 03006 renders the background data and the foreground data on the basis of the MBR to generate virtual viewpoint content (S1006).

Subsequently, the object moves to a position 06306 outside the virtual viewpoint generation area 06301. Then, the virtual viewpoint generation area determination unit 03015 determines that the foreground object to be generated is outside the virtual viewpoint generation area on the basis of the gaze point group information and the foreground object position information (S1002). The rendering mode management unit 03014 determines that the foreground texture generation method is IBR on the basis of the determination result from the virtual viewpoint generation area determination unit 03015. If it is determined that the rendering method is IBR, the virtual viewpoint foreground image generation unit 03005 performs geometric transformation, such as perspective transformation, on each of the foreground images on the basis of the virtual camera parameters and the foreground image group and generates a foreground image viewed from the virtual viewpoint. After the above-described processing is performed, the rendering unit 03006 renders the background data and the foreground data on the basis of IBR to generate virtual viewpoint content (S1006). Note that at this time, the object is in an area outside the virtual viewpoint generation area and is included in an area in which the image of the object is not captured by a subset of the four cameras. That is, the image of the object is captured by at least one of the four cameras.

When the object moves again to the position 06309 inside of the virtual viewpoint generation area 06301, the rendering process based on MBR is performed, and virtual viewpoint content generation is repeated until the object moves to the position 06310 (S1007).

According to the present embodiment, the virtual viewpoint generation area determination unit 03015 determines whether the foreground object to be generated is inside or outside the virtual viewpoint generation area. The rendering mode management unit 03014 selects either MBR or IBR as the foreground texture generation method in accordance with the determination result of the virtual viewpoint generation area determination unit 03015. However, the foreground texture generation method is not limited to MBR and IBR. For example, when a small number of cameras are installed and if the foreground object to be generated is inside the virtual viewpoint generation area, the rendering process based on IBR is performed. If the foreground object to be generated is outside the virtual viewpoint generation area, a camera that captures the image of the target foreground object is identified, and the foreground data from the camera may be selected and deformed to generate a combined virtual viewpoint image. It should be noted that by using a plurality of foreground texture generation methods and employing a configuration that can switch among the foreground texture generation methods in accordance with the image capture condition, such as the number of installed cameras, the present embodiment can be applied to an object other than a stadium.

As described above, according to the present embodiment, even if the foreground object to be generated moves to a position outside the virtual viewpoint generation area 06301, an appropriate rendering method can be selected, and the virtual viewpoint content is generated by using a camera that captures the image of a foreground object. In this manner, the virtual viewpoint video can be displayed without significant quality loss, such as loss of the generated virtual viewpoint content, regardless of the position of the object.

According to the present embodiment, a virtual viewpoint image without quality loss can be output regardless of the position of the object for which the virtual viewpoint image is to be generated.

Second Embodiment

According to the first embodiment, the configuration has been described in which it is determined whether the foreground object to be generated is inside or outside the virtual viewpoint generation area, and the foreground image is generated by switching between the foreground texture generation methods in accordance with the determination result.

According to the second embodiment, a configuration is described in which when it is determined that the foreground object for which a virtual viewpoint image is to be generated is outside the virtual viewpoint generation area, a virtual viewpoint video is switched to a video from a wide view camera that captures a video image at a predetermined camera angle.

Figure 12:
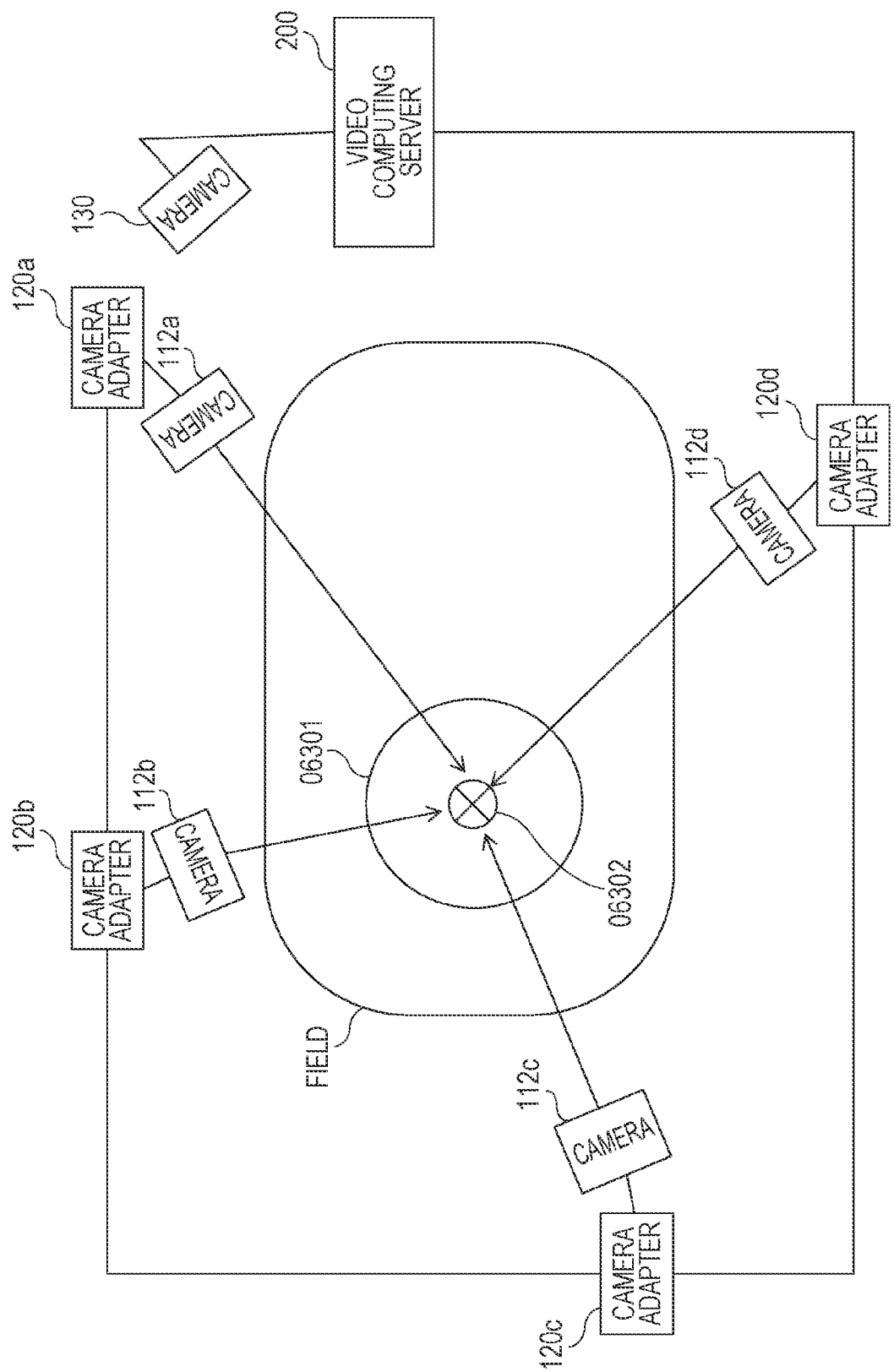
FIG. 12 is a second schematic illustration of the relationship between an object moving in a stadium and a gaze point group.

FIG. 12 is a schematic illustration of a stadium according to the present embodiment. A camera 130 is added to the stadium illustrated in FIG. 2 according to the first embodiment. The camera 130 is a wide view camera that captures a video at a predetermined camera angle. Video information including audio from the camera is directly input to the image computing server 200 using signal transmission interface, such as Ethernet (registered trademark), SDI, DisplayPort, and HDMI (registered trademark).

Figure 13:
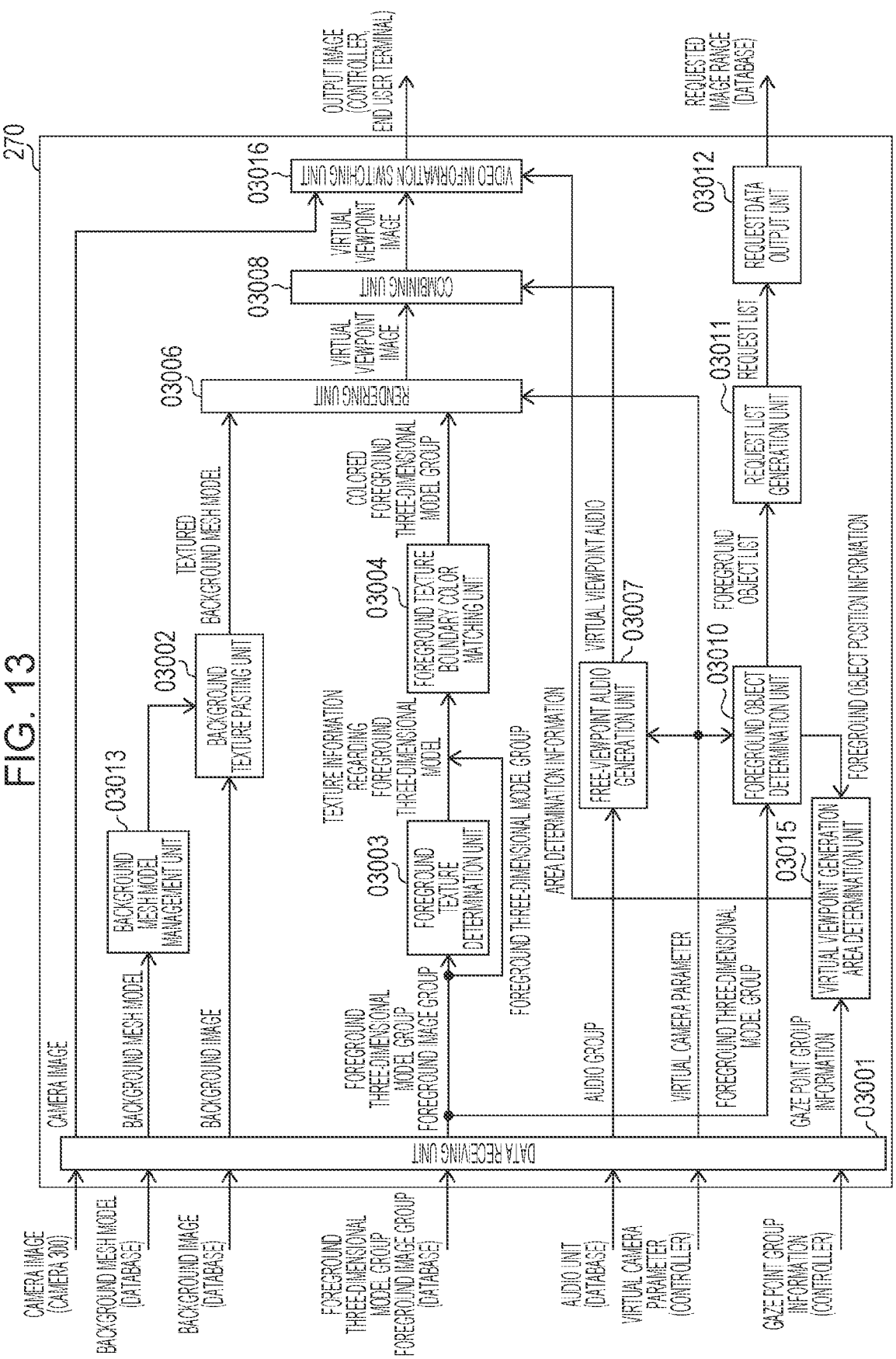
FIG. 13 is a schematic configuration diagram of a back-end server according to one or more aspects of the present disclosure.

FIG. 13 illustrates the configuration of a back-end server 270 according to the present embodiment. Unlike the configuration of the back-end server 270 illustrated in FIG. 6 according to the first embodiment, the rendering unit 03006 only supports MBR as the foreground texture generation method. In addition, a video information switching unit 03016 is added. Video information from the camera 130 is input to the video information switching unit 03016 via the data receiving unit 03001. The video information switching unit 03016 selects and outputs either the video captured by the camera 130 or the virtual viewpoint video output from the combining unit 03008 in accordance with the determination result output from the virtual viewpoint generation area determination unit 03015.

FIG. 14 is a flowchart illustrating the flow of processing for generating virtual viewpoint content in the back-end server 270 when virtual camera parameters based on operator's operation are input from the controller 300, according to the present embodiment. The input virtual camera parameters are based on the operator's operation illustrated in FIG. 9.

First, the foreground object determination unit 03010 determines a foreground object group to be used for display on the basis of the input virtual camera parameters and the foreground three-dimensional model group transmitted from the database 250 (S2001). Subsequently, the virtual viewpoint generation area determination unit 03015 determines whether the foreground object to be generated is inside or outside the virtual viewpoint generation area on the basis of the gaze point group information and the foreground object position information (S2002). In the schematic illustration in FIG. 9, since the object is initially located at the position 06305 inside of the virtual viewpoint generation area 06301, the video information switching unit 03016 is notified that the foreground object to be generated is inside of the virtual viewpoint generation area.

The video information switching unit 03016 selects and outputs the virtual viewpoint video output from the combining unit 03008 in accordance with the area determination information output from the virtual viewpoint generation area determination unit 03015. The foreground texture determination unit 03003 determines the foreground texture on the basis of the foreground three-dimensional model and the foreground image group (S1003). Then, the foreground texture boundary color matching unit 03004 performs color matching at the boundary of the determined foreground texture (S1004). After the above-described processing is performed, the rendering unit 03006 renders the background data and the foreground data on the basis of MBR to generate virtual viewpoint content (S2005).

Subsequently, the object moves to a position 06306 outside the virtual viewpoint generation area 06301. Then, the virtual viewpoint generation area determination unit 03015 determines that the foreground object to be generated is outside the virtual viewpoint generation area on the basis of the gaze point group information and the foreground object position information (S2002). The video information switching unit 03016 outputs the video captured by the camera 130 instead of the virtual viewpoint video output from the combining unit 03008 (S2006).

When the object moves again to the position 06309 inside of the virtual viewpoint generation area 06301, the rendering process based on MBR is performed, and virtual viewpoint content generation is repeated until the object moves to the position 06310 (S2007).

As described above, according to the present embodiment, even if the foreground object to be generated moves to a position outside the virtual viewpoint generation area 06301, the video is switched to the video output from the camera that takes a panoramic perspective shot of the entire field, and the video is continuously output. This can prevent a virtual viewpoint video with significant quality loss (e.g., video without the generated virtual viewpoint content) from being displayed.

According to the present embodiment, a virtual viewpoint image without quality loss is output, regardless of the position of the object for which the virtual viewpoint image is to be generated.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-189029 filed Nov. 19, 2021, which is hereby incorporated by reference herein in its entirety.

What is claimed is:

1. An information processing apparatus comprising:
one or more memories storing instructions; and
one or more processors executing the instructions to:
acquire viewpoint information representing a position of a virtual viewpoint and a line-of-sight direction from the virtual viewpoint used to generate a virtual viewpoint image based on a plurality of images captured by a plurality of image capturing apparatuses; and
output a specific image that includes an object and that is generated based on the viewpoint information,
wherein if the object is included in a specific area, the specific image is a first virtual viewpoint image generated using three-dimensional geometric data representing a three-dimensional shape of the object, the three-dimensional geometric data being generated based on the plurality of images, and
wherein if the object is not included in the specific area, the specific image is a second virtual viewpoint image generated without using the three-dimensional geometric data.

2. The information processing apparatus according to claim 1, wherein the first virtual viewpoint image is a virtual viewpoint image generated by using model-based rendering.

3. The information processing apparatus according to claim 1, wherein the second virtual viewpoint image is a virtual viewpoint image generated by using image-based rendering.

4. The information processing apparatus according to claim 1,
wherein the second virtual viewpoint image is a virtual viewpoint image generated on a basis of a captured image captured by each of the image capturing apparatuses that includes the object in an image capturing range of the image capturing apparatus.

5. The information processing apparatus according to claim 1, wherein the information processing apparatus comprising:
one or more memories storing instructions; and
one or more processors executing the instructions to:
output a specific image that includes an object,
wherein if the object is included in a specific area, the specific image is a virtual viewpoint image generated using three-dimensional geometric data representing a three-dimensional shape of the object, the three-dimensional geometric data being generated based on a plurality of images captured from a plurality of image capturing apparatuses, and wherein if the object is not included in the specific area, the specific image is a captured image captured by a particular image capturing apparatus different from the plurality of image capturing apparatuses.

6. The information processing apparatus according to claim 1, wherein the one or more processors further execute the instructions to determine an image to be output on a basis of the acquired viewpoint information.

7. The information processing apparatus according to claim 1, wherein the area captured by the plurality of image capturing apparatus is an area including a gaze point to which the image capturing apparatus are directed.

8. The information processing method according to claim 1, wherein the specific area is captured from the plurality of image capturing apparatuses.

9. An information processing method comprising:

acquiring viewpoint information representing a position of a virtual viewpoint and a line-of-sight direction from the virtual viewpoint used to generate a virtual viewpoint image based on a plurality of images captured by a plurality of image capturing apparatuses; and outputting a specific image that includes an object and that is generated based on the viewpoint information, wherein if the object is included in a specific area, the specific image is a first virtual viewpoint image generated using three-dimensional geometric data representing a three-dimensional shape of the object, the three-dimensional geometric data being generated based on the plurality of images, and wherein if the object is not included in the specific area, the specific image is a second virtual viewpoint image generated without using the three-dimensional geometric data.

10. The information processing method according to claim 9, wherein the first virtual viewpoint image is a virtual viewpoint image generated by using model-based rendering.

11. The information processing method according to claim 9, wherein the second virtual viewpoint image is a virtual viewpoint image generated by using image-based rendering.

12. A non-transitory computer readable storage medium storing a program which performs an information processing method, the method comprising:

acquiring viewpoint information representing a position of a virtual viewpoint and a line-of-sight direction from the virtual viewpoint used to generate a virtual viewpoint image based on a plurality of images captured by a plurality of image capturing apparatuses; and outputting a specific image that includes an object and that is generated based on the viewpoint information, wherein if the object is included in a specific area, the specific image is a first virtual viewpoint image generated using three-dimensional geometric data representing a three-dimensional shape of the object, the three-dimensional geometric data being generated based on the plurality of images, and wherein if the object is not included in the specific area, the specific image is a second virtual viewpoint image generated without using the three-dimensional geometric data.

* * * * *